United States Patent
Goto et al.

[11] Patent Number: 5,256,268
[45] Date of Patent: Oct. 26, 1993

[54] WATER TREATMENT METHOD AND APPARATUS

[75] Inventors: Nobutaka Goto; Hiroyuki Hashimoto, both of Hino, Japan

[73] Assignee: Konica Corporation, Tokyo, Japan

[21] Appl. No.: 976,685

[22] Filed: Nov. 16, 1992

Related U.S. Application Data

[63] Continuation of Ser. No. 730,209, Jul. 15, 1991, abandoned.

[30] Foreign Application Priority Data

| Jul. 18, 1990 | [JP] | Japan | 2-189737 |
| Sep. 3, 1990 | [JP] | Japan | 2-232946 |
| Nov. 30, 1990 | [JP] | Japan | 2-341139 |
| Jan. 24, 1991 | [JP] | Japan | 3-22606 |

[51] Int. Cl.$^5$ .............. C02F 1/46; C25B 9/00
[52] U.S. Cl. .................. 204/268; 204/269; 204/255; 204/257; 204/275
[58] Field of Search ........... 204/268, 269, 196, 255, 204/257, 275

[56] References Cited

U.S. PATENT DOCUMENTS

| 3,888,756 | 6/1975 | Teshima et al. | 204/149 |
| 4,046,663 | 9/1977 | Fleet et al. | 204/280 |
| 4,308,122 | 12/1981 | Das Gupta et al. | 204/257 |
| 4,330,387 | 5/1982 | Astruc et al. | 204/275 |
| 4,444,631 | 4/1984 | Bommaraju et al. | 204/95 |

Primary Examiner—John Niebling
Assistant Examiner—Arun S. Phasge
Attorney, Agent, or Firm—Jordan B. Bierman

[57] ABSTRACT

A method and an apparatus for treating water by passing the water through an electrolytic bath provided with an anode and a porous cathode. The water is qualified by the decomposition and the reduction of chloride compounds in the water while the water passes through the porous cathode that occupies full area of a cross section of the flow path of the water.

11 Claims, 9 Drawing Sheets

WATER TREATMENT METHOD AND APPARATUS

This application is a Rule 62 continuation of application Ser. No. 730,209, filed Jul. 15, 1991 now abandoned.

BACKGROUND OF THE INVENTION

The present invention relates to an electrolytic bath which can be used for various kinds of electrolysis, and more particularly relates to an electrolytic bath in which an electrochemical treatment is conducted in order to inhibit deterioration in performance caused by micro-organisms contained in the water to be treated, and in order to eliminate the smell of bleach from drinking water which is supplied through the water supply system for domestic and business use. More particularly, the present invention relates to an electrolytic bath for sterilization of photographic processing solutions utilized for the processes of color development, bleaching, bleaching and fixing, fixing, stabilizing, and washing, and further for sterilization of water to be used in a swimming pool, for paper making, in a heat exchanger, for drinking, for fish breeding, in a public bath, and etc, by processing water electrochemically.

Various kinds of water solutions are conventionally utilized for various purposes. When these water solutions provide adequate nourishment, or the temperature is suitable for propagation of bacteria, bacteria breed in the solution, so that the performance of the solution is deteriorated and the bred bacteria float in the processing apparatus and damage its function.

For example, in the case of photographic light sensitive material, a photographic paper is processed through the processes of color development, bleaching and fixing, water washing and/or stabilization, and finally the photographic paper is dried. In the aforementioned photographic processes, various kinds of photographic processing solutions such as a color developing agent, bleaching agent, bleaching and fixing agent, fixing agent, stabilizer, and washing water, are utilized. The aforementioned light sensitive materials contain gelatin and various inorganic salts, so that they provide an adequate environment for bacteria to breed. Consequently, the following problems are caused: bacteria mixed into the aforementioned photographic processing solutions breed and the efficiency of photographic material processing is lowered; unevenness is caused in the color of a print; and obtained images are stained because of mold. In order to prevent the deterioration of photographic processing solutions, disinfectant or an anti-mold agent is conventionally added to the solutions so that the aforementioned bacteria can be eliminated. According to the aforementioned method, a large amount of anti-mold agent needs to be added, so that the added anti-mold agent tends to remain in the photographic solutions or the aforementioned light sensitive material and exerts a bad influence on the light sensitive material. Further, most of the aforementioned anti-mold agents are poisonous, and their use is regulated. Furthermore, when the anti-mold agent is used for a certain period of time, resistance is generated in the bacteria, so that another anti-mold agent must be applied to eliminate the bacteria.

In the water of public pools, a large number of microorganisms such as coliform bacilluses and bacteria live, and they are harmful to the eyes of a swimmer. In order to protect the swimmer, a disinfectant such as sodium hypochlorite is added to the water of the pool for disinfection. A chloric reagent such as sodium hypochlorite and liquid chloride is used since they are effective for disinfection. The chloric reagent itself, and its decomposed products, also cause problems, such as sore eyes and skin eruptions, which can be serious with weak infants. Since the chloric reagent decomposes, it can not be used continuously, so that water must be supplied every day. Accordingly, a large amount of water is consumed for a swimming pool and the cost of disinfectant to be used becomes a heavy burden.

In this modern "information society", the demand for various kinds of papers, especially papers of high quality, has increased. These papers are made from pulp for paper-making use through various processes. Pulp is cleaned in order to remove unnecessary components before it is processed in the paper-making process. An adequate temperature of the aforementioned pulp is maintained, and the pulp contains adequate nourishment, so that mold and bacteria tend to breed in the pulp and a large amount of mold and bacteria remain in the final product, which results in deterioration of the quality of the paper. Accordingly, an anti-mold agent and disinfectant are added to the large amount of water used in the aforementioned cleaning process in order to prevent the deterioration of the paper. However, the following problems are caused in the aforementioned method: the costs of the anti-mold agent and disinfectant are raised; and deterioration of quality due to the residual anti-mold agent and disinfectant is caused.

Recently, the number of air conditioners has increased as the number of condominiums and office buildings has increased in which air conditioners are installed. In the condominium and office building, a cooling tower, which is a heat exchanging unit, is installed on the roof of the building. When the same water is used in the heat exchanging unit over a long period of time, microorganisms such as mold and bacteria breed in the water and precipitate on the heat exchanging surface of the aforementioned heat exchanging unit. Consequently, heat exchanging performance is deteriorated and piping can become blocked by a lump of microorganisms, which leads to the decrease in heat exchanging ability. A large amount of discharged microorganisms causes serious problems such as corrosion of the piping.

Recently, consumption of water for baths has increased. The temperature of bath water is approximately 40° C., which is the optimum temperature for microorganisms to breed, so that microorganisms breed very quickly, and even faster when the water becomes dirty. The size of a microorganism is so minute that it is difficult to remove it from water by means of filtering. In the case of a public bath, the amount of water to be processed is large, so that the cost of processing can be greatly reduced when dirty bath water can be processed by a simple processing operation.

Recently, a large number of fish have been bred in breeding ponds, and supplied to the market. When fish are bred in a breeding pond, various kinds of chemicals are added into the water in a breeding pond in order to exterminate microorganisms, since the microorganisms contaminate fish, and lessen the value of the fish. Food is supplied to the fish in the breeding pond, and consequently, a large amount of chemicals, anti-mold agent and disinfectant, which are harmful to humans, are accumulated in the fish, and the contaminated fish come on the market.

Drinking water is supplied to houses and restaurants from a reservoir through a water supply system after it has been sterilized in a purification plant. Sterilization is generally conducted by chlorite gas. Microorganisms are mostly exterminated by the sterilization by chloric gas. On the other hand, the residual chloride affects the taste and flavor of drinking water.

Drinking water is very important for our health, so that it is essential to prevent microorganisms from breeding in drinking water and it is also important to exterminate microorganisms living in water. Mold and microorganisms are mostly disinfected by means of chloride disinfection. However, sources of water such as rivers and lakes are contaminated by various kinds of organisms, so that more chloride than that is required to exterminate the microorganisms is added to the water. Accordingly, effective chloride components such as an organic halide, hypochlorous acid ions and residual chloride are generated. In order to solve the aforementioned problems, methods of disinfection in which chloride is not utilized, have been proposed.

For example, a method to improve the quality of water by the processing of ozone addition or the processing of activated carbon absorption has been proposed. However, when water is processed by the aforementioned method in a purification plant, the cost is very high. Furthermore, there is still a problem that even if water is processed in a purification plant, microorganisms are bred again during the conveyance of water from the purification plant to the consumer.

As described above, the main method of disinfection of drinking water is the chloride method. When the chloride method is adopted, hypochlorous acid ions are generated or chloride gas remains so that the smell of bleach is caused. In order to remove the smell of bleach, the following method is adopted: hypochlorous acid ions (effective chloride), which are the source of the smell, are absorbed by activated carbon; and effective chloride is reduced by oxidizing the activated carbon.

However, this method is disadvantageous in that: since there is a limit in the absorbing capacity of activated carbon, defective chloride decomposition is caused after activated carbon has been used for a certain period of time; and replacement of activated carbon is troublesome and expensive, so that the smell of bleach can not be eliminated completely.

Consequently, there is a demand for a water processing method replacing hypochlorous acid ions which are harmful to humans and tend to affect the taste of water.

In order to prevent the aforementioned problems, various chemicals such as an anti-mold agent and precipitation inhibitor are added to the water to be processed, or various kinds of filters are installed in the intermediate portion of piping. When chemicals are added, residual chemicals affect the quality of water to be processed as described before, and the cost is increased. Furthermore, microorganisms become resistant to the chemicals when the chemicals are used for a certain period of time, so that another chemical must be used.

In order to solve the aforementioned problems of the conventional technique, the applicant has proposed a method in which water to be processed can be electrochemically processed so that the water can be disinfected and the bleach smell can be removed (which has been disclosed in Japanese Patent Application 326846/1989. According to the electrochemical processing method described above, the water to be processed can be positively processed without leaving the residual chemical in the water. In the aforementioned electrochemical processing, the electrode to be utilized is not limited particularly. However, a carbon electrode is preferably used for the reasons that: no harmful substance is contained in carbon; the cost is low; bacteria are easily absorbed; the over-voltage is high; and an unnecessary reaction such as generation of oxygen can be inhibited.

The carbon electrode has the aforementioned advantages. On the other hand, it has a disadvantage in that when oxygen gas is generated, the carbon electrode is quickly consumed. Accordingly, when a carbon electrode is used over a long period of time, it is consumed gradually and the distance between the electrodes is increased, so that the voltage is increased or carbon particles flow out in the processing solution. Accordingly, the carbon electrode must be finally replaced with a new one. In general, replacement of the electrode must be conducted after the entire electrolytic bath has been overhauled. Consequently, the replacing work is very complicated and the efficiency is lowered.

SUMMARY OF THE INVENTION

The first object of the present invention is to provide a method and apparatus to supply delicious drinking water by solving the aforementioned problems of the conventional technique in such a manner that: drinking water containing effective chloride components is electrochemically processed in order to completely remove the smell of bleach which is caused when effective chloride such as hypochlorous acid ions is mixed with drinking water.

The second object of the present invention is to provide a carbon electrode type of electrolytic bath by solving the aforementioned problems of the conventional technique in such a manner that: the durability of a carbon electrode is maximized, making the most of the merits of the carbon electrode.

The present invention is to provide a water processing method characterized in that: water to be processed containing effective chloride components is supplied to a single electrode type of electrolytic bath having a fixed floor type of cathode, inside which the water to be processed can be circulated; and the aforementioned effective chloride components are decomposed or reduced by the cathode so that the quality of the water to be processed can be improved. The apparatus of the present invention comprises the single electrode type of electrolytic bath in which the fixed floor type of cathode is provided, wherein the cross-sectional area of the cathode is actually the same as that of a passage of water to be processed and the aforementioned water to be processed can be circulated in the cathode, and the aforementioned water to be processed containing effective chloride components is supplied to the electrolytic bath and the aforementioned effective chloride components are decomposed or reduced on the surface of the aforementioned cathode. In the present invention, in some cases, an actual electrochemical reaction is not caused on the surface of an electrode. Accordingly, the tank to be used in the present invention should be referred to as an electrochemically processing bath. However, it will be referred to as an electrolytic bath in this specification, hereinafter.

The present invention is to provide a processing method of water which is characterized in that: water to be processed containing effective chloride components is supplied to a double electrode type of electrolytic bath provided with a fixed floor type of porous cathode; and the aforementioned effective chloride components are decomposed or reduced on the surface of the aforementioned cathode so that the quality of the aforementioned water to be processed can be improved. The apparatus of the present invention is a water processing apparatus comprising a double electrode type of electrolytic bath in which a fixed floor type of porous cathode is installed, wherein the cross-sectional area of the cathode is the same as that of a passage of the water to be processed, and wherein the aforementioned water to be processed containing effective chloride components is supplied to the cathode so that the aforementioned effective chloride components can be decomposed or reduced.

The present invention is to provide a three dimensional electrode type of electrolytic bath in which three dimensional porous carbon electrode is used, and which is characterized in that: an auxiliary electrode is installed, wherein the auxiliary electrode is contacted with at least a portion of the aforementioned carbon electrode, and made from a material, the over-voltage of which is lower than that of the carbon electrode, and the opening ratio of the auxiliary electrode is not more than 80%.

BRIEF DESCRIPTION OF THE DRAWINGS

FIG. 10 is a longitudinal sectional view showing the outline of a fixed floor double carbon electrode type of electrolytic bath;

FIGS. 11, 12, 13 and 14 are longitudinal sectional views showing the outline of a fixed floor single carbon electrode type of electrolytic bath relating to the present invention;

DETAILED DESCRIPTION OF THE PREFERRED EMBODIMENTS

Figure 1:
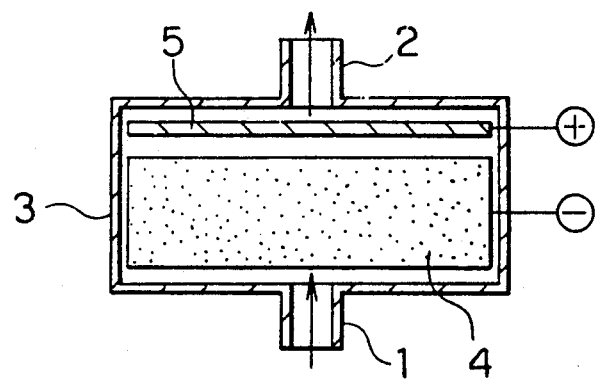
FIGS. 1, 2, 3, 4, 5 and 6 are longitudinal sectional views showing the first to sixth examples of a single electrode type of electrolytic bath which can be used for the present invention.

Referring to the drawings, the present invention will be explained in detail as follows.

The present invention is characterized in that: in order to eliminate the smell of bleach, water to be processed, which contains effective chloride components, such as drinking water and food processing water is supplied to an electrolytic bath provided with a porous cathode so that the water to be processed can be sufficiently contacted with the porous cathode and the aforementioned effective chloride components, especially hypochlorous acid ions, are electrochemically reduced and decomposed. To process drinking water and water to be used for food processing, is a primary object of the present invention. In this specification, drinking water includes faucet water, and food processing water includes water in which perishable foods are cleaned, and further includes water which is contained in perishable foods.

When a hypochlorous acid ion, which is the principal component of the effective chloride component contained in the water to be processed, is contacted with the aforementioned porous cathode, it is decomposed to a chloride ion and water according to the following equation.

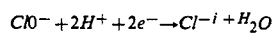

$$ClO^- + 2H^+ + 2e^- \rightarrow Cl^{-i} + H_2O$$

Further, residual chloride in the water to be processed is contacted with the cathode and reduced according to the following equation.

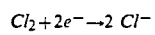

$$Cl_2 + 2e^- \rightarrow 2\ Cl^-$$

In general, electrons are consumed in the aforementioned electrochemical reactions, so that it is necessary to cause an actual electrolytic reaction by supplying an electric current. However, in the case of effective chloride components contained in the water to be processed, the amount of chloride is very small, that is several ppm. Therefore, if there is a residual electric charge on the cathode, the processing of water can be sufficiently conducted. Accordingly, water processing according to the present invention may be or may not be accompanied by the generation of gas. However, if as is generated in the processing, water to be processed is changed and the taste is affected by the generated gas. Consequently, it is preferable that a voltage is impressed upon the cathode so that the voltage of $-0.1$ to $-1.0$ V (vs.SHE) can be generated on the cathode.

When water is processed while a voltage which does not cause actual gas generation, is being impressed upon the cathode, no electric current flows in the apparatus, so that the consumption of electricity is approximately zero. Therefore, while the cost of electricity is zero, water processing can be conducted, the efficiency of which is approximately the same as that of the conventional chloride adding method or the electrolytic method in which a large amount of electricity is consumed.

In general, calcium and magnesium are contained in faucet water, and when the amount is too much, the taste of the water is affected. In order to improve the taste of drinking water, calcium and magnesium are removed by precipitating them on the aforementioned porous cathode in the form of calcium hydroxide and magnesium hydroxide, before the aforementioned drinking water is electrochemically processed.

In drinking water or food processing water, a very small amount of ion and solute of calcium and magnesium are contained in the form of a hydrated cluster. This hydrated cluster is one of the causes to deteriorate the taste of drinking water. When a voltage, which is so low that an actual electrolytic reaction is not caused, is impressed upon drinking water containing the aforementioned hydrated cluster, ions in the drinking water migrate and move at a high speed in accordance with the potential gradient, so that the aforementioned cluster can not move and a large cluster is broken, or the aforementioned ion having a hydrated cluster is broken, and the number of the aforementioned hydrated cluster is remarkably reduced Accordingly, the quality of drinking water can be improved.

In the water processing of the present invention, the more frequently the water to be processed contacts with the cathode, the higher the processing efficiency is increased. Consequently, as described above, an electrolytic bath having a fixed floor type of cathode inside which the water to be processed can flow, is used for the apparatus of the present invention. This type of cathode will be referred to as a porous cathode, hereinafter.

The cathode in the electrolytic bath according to the present invention is preferably made from a porous material through which the aforementioned water to be processed can permeate, for example, a carbon material such as activated carbon, graphite, and carbon fiber, the shape of which is granular, a sheet of felt, a fiber, a porous block, or a solid having a large number of though-holes, and further the cathode is preferably made from the aforementioned carbon material in which copper, nickel, iron and precious metals are contained. It may be made from a metallic sintered body, for example a sintered body of nickel. In the water processing according to the present invention, it is necessary for the water to be processed to contact with the aforementioned porous cathode as long as possible, so that it is necessary for the water to be processed to stay in the aforementioned porous cathode for as long as possible. In other words, the water to be processed must penetrate into the aforementioned porous cathode as deeply as possible and permeate through the cathode. In order to make the water to be processed penetrate into the porous cathode, it is preferable to use a material of low resistance, the over-voltage of which is high, for the cathode. That is, when the resistance is low, an electric current can be dispersed all over the cathode, and when the over voltage is high, a predetermined reaction is caused not only on the surface of the cathode but also inside the cathode. In the case where the over-voltage is low, the reaction is caused only on the surface of the cathode, and there is no sense in using a porous cathode.

The aforementioned carbon material satisfies the necessary condition, that is low resistance and high overvoltage, so that it is effectively used in the present invention. Further, the carbon material is not toxic at all, and ions and their hydroxides are not formed, so that it is preferably used to process water for drinking use and food processing use. Since the surface area of carbon material is very wide, the effective chloride components are frequently contacted with the carbon material. Accordingly, the processing efficiency can be remarkably improved. Further, the cost of carbon material is low, and even when an electrolytic operation has been stopped, the carbon material is not corroded. Consequently, it is advantageous from the viewpoints of economy and operability. The rate of opening of the porous cathode is not less than 10% and not more than 95%, and preferably not less than 20% and not more than 80% so that the movement of the water to be processed can not be blocked. It is preferable that the diameter of the through hole is made small so that the water to be processed can permeate the hole.

By the anode utilized in the apparatus of the present invention, the effective chloride component can not be decomposed or oxidized. Consequently, it is not necessary for the aforementioned water to be processed to contact with the anode and its shape is not limited. When the water to be processed flows through the anode, it is preferably mesh-shaped so that the water to be processed can be circulated smoothly, wherein the anode is not necessarily porous. When a porous anode is utilized, its porousness is preferably lower than that of the cathode, that is, the anodic current density is preferably higher than the cathodic current density. The following materials can be used for the anode: graphite, carbon, titanium covered with platinum oxide (an electrode of stable size), titanium covered with platinum, nickel, and ferrite.

In the electrolytic bath of the present invention, the aforementioned cathode and anode may not be preferably separated by a diaphragm in order to form a cathodic and anodic chamber. However, a diaphragm may be used in the apparatus of the present invention, for example, the following are used for the diaphragm: a fiber cloth, a clay plate, sintered plastic, a perforated panel and an ion exchange membrane. When the distance between the two electrodes is shortened in order to reduce the voltage, an insulating spacer, for example, a net-shaped spacer which is made from a high molecular organic material, is preferably inserted between the electrodes in order to prevent a short-circuit.

The electrolytic bath composed in the aforementioned manner is installed in the pipe line of a purification plant or in the position close to the faucet in a home or restaurant so that the water can be processed in the electrolytic bath in such a manner that the effective chloride component is decomposed or reduced.

When the water to be processed is supplied to the electrolytic bath in the state of a laminar flow, the water passes through the aforementioned electrolytic bath without sufficiently coming into contact with the surface of the single electrode type of cathode. Accordingly, the aforementioned porous cathode is installed inside the electrolytic bath without leaving any gaps, and further the water to be processed is preferably supplied to the electrolytic bath in the state of an eddy flow, the Reynold's number of which is not less than 500, so that the water can be sufficiently moved in the lateral direction.

When water is processed in the manner described above, the effective chloride component can be sufficiently removed by a single processing operation, so that the efficiency can be improved.

In the electrolytic bath of the present invention, a leakage current is generated, which flows from the electrolytic bath to other metallic parts such as a water pipe, and corrodes the metallic parts electrochemically. The aforementioned leakage current can be cut off in such a manner that: a member, the electrical conductivity of which is higher than that of the water to be processed, is installed on the back side of the electrode and in an inlet and outlet pipe of the electrolytic bath, wherein the end of the member is earthed.

Referring now to the attached drawings, preferable embodiments of the electrolytic bath of the present invention will be successively explained as follows. It should be understood that the electrolytic bath of the present invention is not limited to the specific embodiment.

FIG. 1 to FIG. 6 are longitudinal sectional views showing examples of the single electrode fixed floor type of electrolytic bath of the present invention.

The single electrode type of electrolytic bath of the present invention usually comprises one cathode and one anode. However, the single electrode type of electrolytic bath of the present invention includes a plurality of electrodes which are connected with each other so that the same voltage can be obtained. In the single electrode type of electrolytic bath, a low voltage is sufficiently impressed upon the electrode. Accordingly, when drinking water is processed for domestic use, a voltage supplied from a dry battery can be sufficiently used, so that it is possible to reduce the size of the processing apparatus.

FIG. 1 shows an example of the electrolytic bath which can be used for the apparatus of the present invention. An inlet 1 is provided in the middle portion of a bottom plate of a cylindrical electrolytic bath 3, and an outlet 2 is provided in the middle portion of a roof of the cylindrical electrolytic bath 3. In the lower portion inside the electrolytic bath 3, a cylindrical porous fixed floor type of cathode 4 made from a carbon material or metallic sintered body, is installed in such a manner that a small gap is formed between the cathode and the inner wall of the aforementioned electrolytic bath 3. An anode 5 made from titanium covered with a platinum oxide, the shape of which is a mesh, is provided above the cathode 4, wherein a small gap is formed between the anode 5 and cathode 4. The aforementioned electrolytic bath 3 is preferably made from a durable material, for example, the following synthetic resins are preferably used: polyepichlorohydrin, polyvinyl methacrylate, polyethylene, polypropylene, polyvinyl chloride, polyethylene chloride, phenol formaldehyde resin, and the like.

The electrolytic path 3 composed in the manner described above, is installed in the middle of a water pipe line or in a position close to a tap. When drinking water containing the effective chloride component such as hypochlorous acid is supplied to the electrolytic bath 3 from the inlet 1, the drinking water comes into contact with the lower face of the porous cathode 4. While the drinking water passes through the cathode 4, the effective chloride components such as hypochlorous acid ions and chloride ions are decomposed or reduced so that the smell of bleaching powder can be removed and magnesium and calcium can be precipitated, and then the processed water is discharged to the outside from the outlet 2. In the electrolytic bath of this example, water flows upward, so that hydrogen and oxygen gas generated in the electrolytic reaction can be easily discharged to the outside of the bath together with the water flow.

In the aforementioned process, hypochlorous acid ions contained in the drinking water are sufficiently contacted with the cathode 4, and the aforementioned reaction of decomposition and reduction is conducted in accordance with the law of electrochemistry. In the apparatus of this example, processing of drinking water can be positively conducted, which is different from the absorption method by activated carbon. Furthermore, a large amount of drinking water can be processed without providing consumables while maintenance such as overhaul and cleaning is not required.

Figure 2:
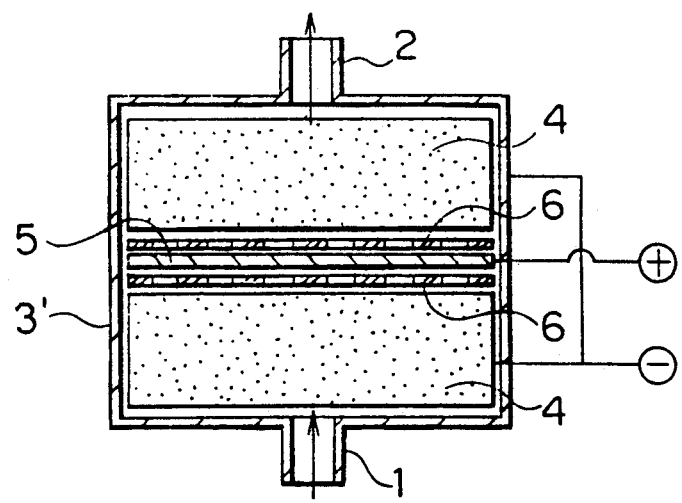

FIG. 2 is a longitudinal sectional view showing the second example of the single electrode fixed floor type of electrolytic bath of the present invention. The electrolytic bath shown in FIG. 2 is related to improvements in the electrolytic bath shown in FIG. 1, wherein like reference characters designate like or corresponding parts throughout the drawings, and explanations will be omitted.

The longitudinal length of an electrolytic bath 3' is longer than that of the electrolytic bath 3 shown in FIG. 1, and a pair of porous cathodes 4 and a mesh-shaped anode 5 which is pinched by the cathodes 4 are installed inside the electrolytic bath 3'. A spacer 6 made from an organic high molecular material is provided between the aforementioned cathode 4 and anode 5 in order to prevent a short-cut. Both porous cathodes 4 described above are electrically connected so that the same electric potential can be maintained.

When drinking water is supplied to the electrolytic bath 3' from the inlet 1 in the same way as the electrolytic bath 3 shown in FIG. 1, the drinking water comes into contact with the lower surface of the lower porous cathode 4, and penetrates the lower and upper porous cathodes 4 so that the effective chloride components can be sufficiently decomposed, and then discharged to the outside of the bath from the outlet 2.

Figure 3:
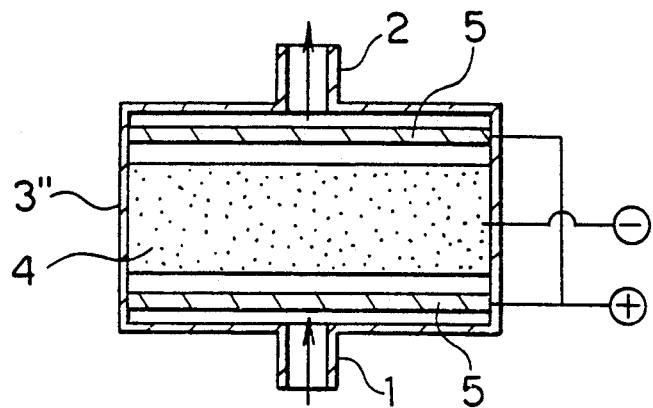

FIG. 3 is a longitudinal sectional view showing the third example of the single electrode fixed floor type of electrolytic bath of the present invention. The electrolytic bath shown in FIG. 3 is related to improvements in the electrolytic bath shown in FIG. 1 and FIG. 2, wherein like reference characters designate like or corresponding parts throughout the drawings, and explanations will be omitted.

The longitudinal length of an electrolytic bath 3" is little longer than that of the electrolytic bath 3' shown in FIG. 2. A pair of mesh-shaped anodes 5 and a porous cathode 4 pinched by the aforementioned anodes 5, are installed in the electrolytic bath 3", and both anodes 5 described above are electrically connected so that the same electric potential can be maintained.

When drinking water is supplied to the electrolytic bath 3" from the inlet 1 in the same way as the apparatus shown in FIG. 1, the drinking water penetrates the mesh of the lower anode 5, and comes into contact with the porous cathode 4 so that the effective chloride component can be sufficiently decomposed. After that, the drinking water penetrates the mesh of the upper anode 5 and then discharged from the aforementioned outlet 2 to the outside of the bath.

Figure 4:
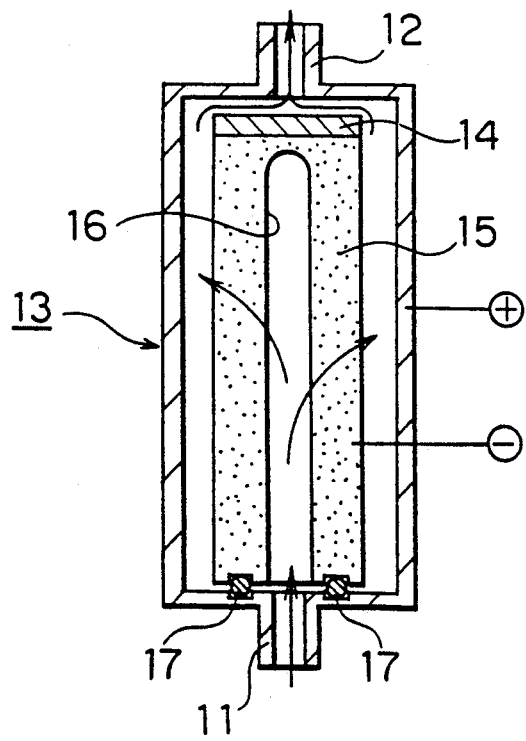

FIG. 4 is a longitudinal sectional view showing the fourth example of the single electrode fixed floor type of electrolytic bath of the present invention.

The cylindrical inner wall of an electrolytic bath 13 functions as an anode, and an inlet 11 is provided to the center portion of the bottom plate of the electrolytic bath 13, and further an outlet 12 is provided to the center portion of the roof of the electrolytic bath 13. Inside the electrolytic bath 13, a cylindrical porous cathode 15 is provided in such a manner that a baffle plate 14 is mounted on the upper surface of the cathode 15; and a small gap is formed between the baffle plate 14 and the inner wall of the electrolytic bath 13, wherein a cut-out portion 16 is formed in the cathode 15 from the lower center to the upper side of the cathode and the cut-out portion 16 reaches a position below the aforementioned baffle plate. An O-shaped ring 17 is provided between the lower surface of the cathode 15 and the lower inside surface of the electrolytic bath 13 in order to prevent the leakage of water.

When drinking water is supplied to the electrolytic bath 13 from the inlet 11, the leakage of water from the gap between the lower inner surface of the electrolytic bath 13 and the lower surface of the cathode 15 is prevented by the aforementioned O-shaped ring, so that the water rises inside the aforementioned cut-out portion 16, and then penetrates the aforementioned porous cathode 15. Then the water reaches the outer periphery of the cathode 15, and further rises and passes in the gap formed above the baffle plate 14, and finally discharges from the outlet 12 to the outside of the apparatus.

Figure 5:
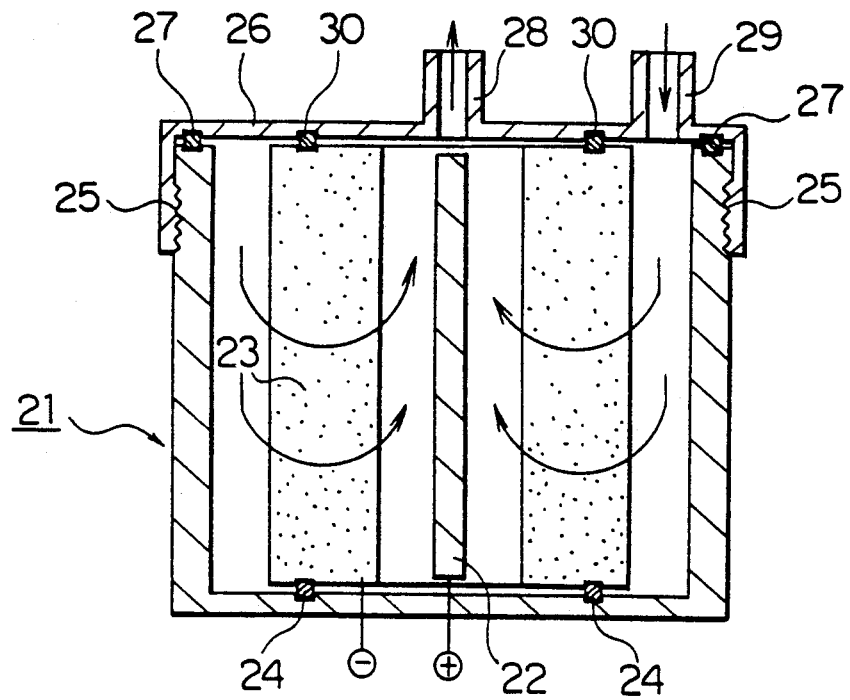

FIG. 5 is a longitudinal sectional view showing the fifth example of the single electrode fixed floor type of electrolytic bath of the present invention.

The upper surface of a cylindrical electrolytic bath 21 is opened, and a rod-shaped anode 22 is installed in the center of the inside of the electrolytic bath 21. A doughnut-shaped porous cathode 23 is provided around the anode 22 leaving a gap between the cathode 23 and the rod-shaped anode 22 in such a manner that the porous cathode 23 comes into contact with the lower inner surface of the electrolytic bath 21 through an O-shaped ring 24. A screw 25 is formed on the upper side surface of the electrolytic bath 21, and a screw formed on the peripheral inner surface of a disk-shaped lid 26, the peripheral portion of which is bent downward, engages with the aforementioned screw 25, and the gap between the the lid 26 and the electrolytic bath 21 is sealed by an O-shaped ring 27 which is provided on the upper edge of the electrolytic bath 21. An outlet 28 is provided in the center of the upper surface of the aforementioned lid 26, and an inlet 29 is provided in the position located a little outside the outlet 28. An O-shaped ring 30 is provided between the lower surface of the lid 26 and the upper surface of the cathode 23.

When drinking water is supplied to the aforementioned electrolytic bath 21 from the inlet 29 the drinking water penetrates the porous cathode 23 from the periphery so that the effective chloride component can be decomposed or reduced, and then reaches the inside of the doughnut-shaped cathode 23 and rises inside the space of the cathode, and finally discharges from the aforementioned outlet 28.

Figure 6:
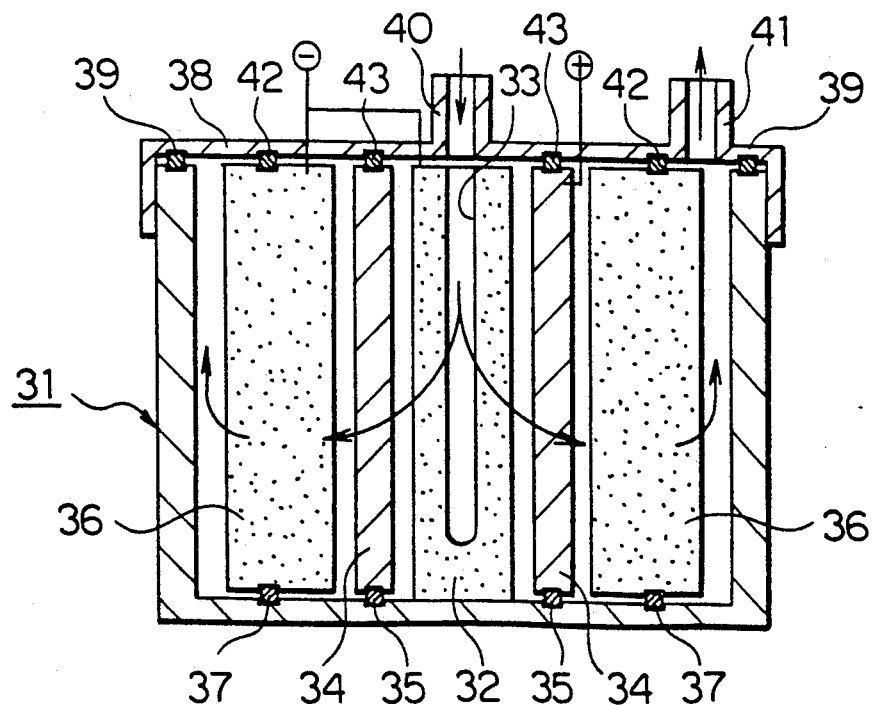

FIG. 6 is a longitudinal sectional view showing the sixth example of the single electrode fixed floor type of electrolytic bath of the present invention.

A cylindrical porous cathode 32 is provided in the center inside a cylindrical box-shaped electrolytic bath 31, the upper surface of which is opened. A cut-out portion 33 is formed in the cathode 32 from the upper surface in such a manner that the cut-out portion 33 reaches a position above the lower surface of the cathode 32. A doughnut-shaped anode 34 having a mesh is concentrically provided around the cathode 32 leaving a gap between the anode and the cathode. The lower surface of the anode 34 is contacted with the lower surface of the aforementioned electrolytic bath 31 through an O-shaped ring 35. A doughnut-shaped porous cathode 36 is concentrically provided around the aforementioned anode 34, and the lower surface of the aforementioned cathode 36 is contacted with the lower inner surface of the aforementioned electrolytic bath 31 through an O-shaped ring 37. Both porous cathodes 32 and 36 are connected with each other so that the same electric potential can be maintained. The peripheral portion of a disk-shaped lid 38 is bent downward, and the bent peripheral portion engages with the upper outside surface of the electrolytic bath 31. The gap between the lid 38 and the electrolytic bath 31 is sealed by an O-shaped ring 39. An inlet 40 is provided in the center of the upper surface of the aforementioned lid 38, and an outlet 41 is formed in a position a little outside the inlet 40. A pair of O-shaped rings 42 is provided between the lower surface of the lid 38 and the upper surface of the cathode 36, and a pair of O-shaped rings 43 is provided between the lower surface of the lid 38 and the upper surface of the anode 34.

When drinking water is supplied to the electrolytic bath 31 from the inlet 40, the drinking water goes down inside the cut-out portion 33 of the porous cathode 32 and penetrates the cathode 32 so that the water reaches the periphery of the cathode 32. Then, the water is processed in the cathode 36 placed outside the cathode 32, and goes up in the space outside the cathode 36 and finally discharges to the outside of the electrolytic bath 31 from the outlet 41.

Figure 7:
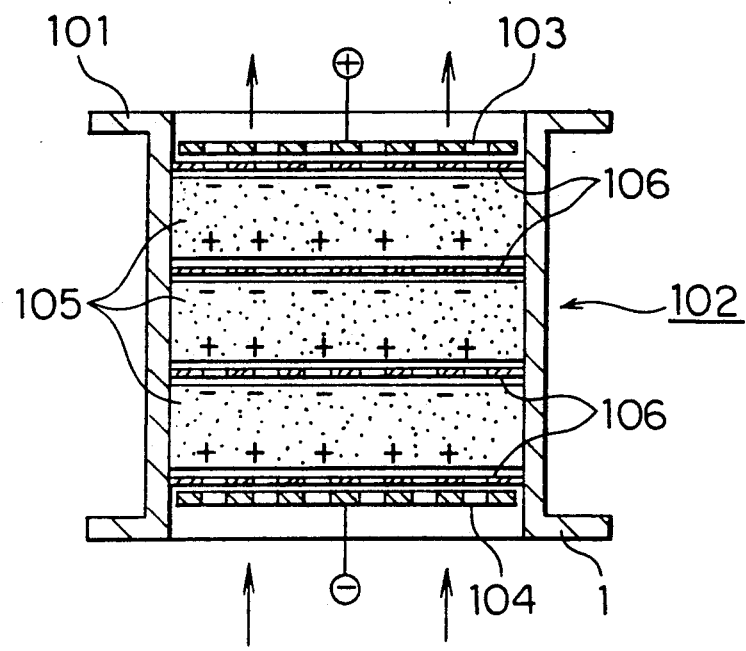
FIGS. 7, 8, and 9 are longitudinally sectional views showing three examples of the structure of a double electrode type of electrolytic bath which can be used for the present invention.
Figure 8:
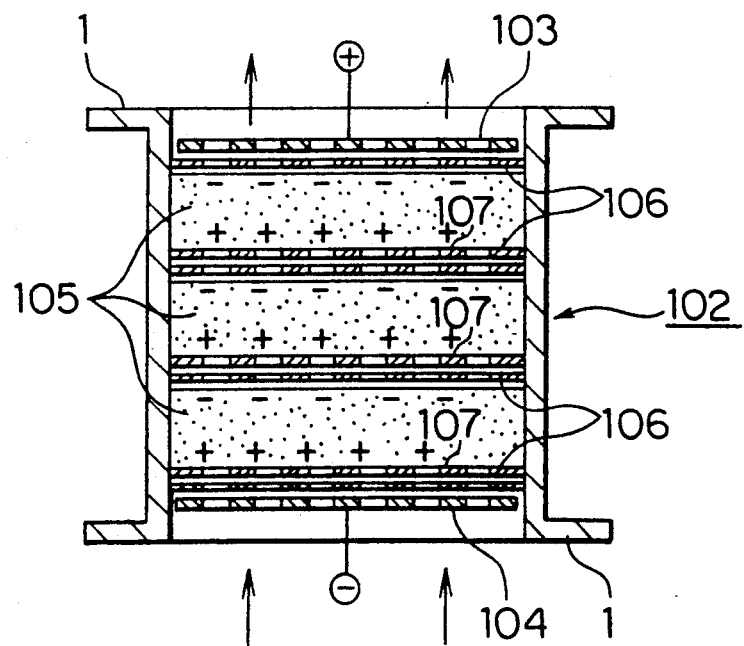
Figure 9:
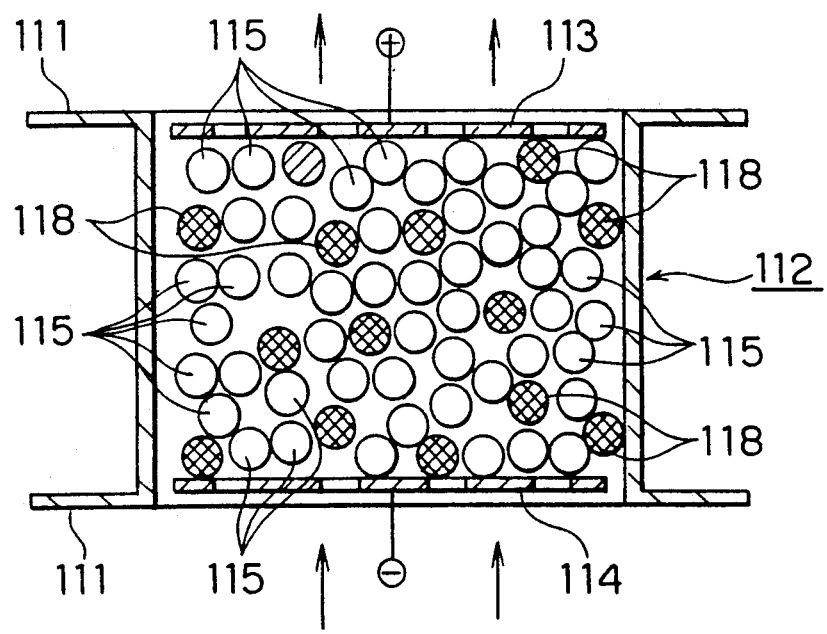

FIG. 7 to FIG. 9 show examples of a multi-electrode type of electrolytic bath of the present invention. In this specification, the multi-electrode type of electrolytic bath is defined as an electrolytic bath which is provided with a plurality of cathodes and/or anodes upon which different voltages are impressed.

In the water processing of the present invention, the more frequently the water to be processed contacts with the cathode, the higher the processing efficiency is increased. In the multi electrodes type of electrolytic bath of the present invention, the surface area of the porous electrodes in the electrolytic bath is extremely large, so that the contact area of the electrode with the water to be processed can be increased. Consequently, the apparatus can be made compact, and the efficiency of electrochemical processing can be improved.

The multi-electrodes type of electrolytic bath of the present invention includes an electrolytic bath in which porous dielectric that can be polarized into the anode and cathode is used, and includes an electrolytic bath in which anodic and cathodic materials are laminated by turns. In the case of the former electrolytic bath, one end of the porous dielectric is polarized so that a porous cathode can be formed, and in the case of the latter electrolytic bath, the porous cathode itself functions as a cathode. The shape of the porous cathode is determined according to the shape of the electrolytic bath. The following are preferably used: carbon materials such as activated carbon, graphite and carbon fiber, the shape of which is a grain, felt, fiber, or porous block; metallic materials such as nickel, copper, stainless, iron, and titanium, the shape of which is the same as those described above; and metallic materials coated with a precious metal, the shape of which is a grain, fiber, felt, cloth, porous block or sponge, wherein a sintered body of nickel may be used.

In order to conduct water processing of the present invention, it is necessary for the water to be precessed to contact with the aforementioned porous cathode as long as possible. In order to attain the aforementioned object, the water to be processed is required to stay in the porous cathode, in other words, the water to be processed needs to penetrate and permeate the porous cathode. In order to penetrate the water to be processed into the porous cathode, it is preferable that the resistance of the cathode is low and over-voltage is high. That is, when resistance is low, it is easy for the water to be processed to penetrate into the inside of the porous cathode, and when over-voltage is high, the required reaction can be easily caused not only on the surface of the cathode but also inside the cathode. When over-voltage is low, the reaction occurs only on the surface, and the usage of a porous cathode becomes meaningless.

Resistance of the aforementioned carbon materials is low and over-voltage is high, so that they can be effectively used for the apparatus of the present invention. Further, carbon materials are not toxic at all, and ions and hydroxides are not formed, so that they are suitable for drinking water or food processing water which is ingested into human body. The area of the contact surface is extremely wide, so that the processing efficiency of effective chloride components can be largely improved. Furthermore, carbon materials are advantageous in that: they are inexpensive, and even when an electrolytic operation has been stopped, carbon materials are not corroded. Consequently, it is advantageous from the viewpoints of economy and operability. The rate of opening of the porous cathode is not less than 10% and not more than 95%, and preferably not less than 20% and not more than 80% so that the movement of the water to be processed can not be blocked. It is preferable that the diameter of the through hole is made small so that the water to be processed can permeate the hole.

By the anode utilized in the apparatus of the present invention, the effective chloride component can not be decomposed or oxidized. Consequently, it is not necessary for the aforementioned water to be processed to contact with the anode and its shape is not limited. When the water to be processed flows through the anode, it is preferably mesh-shaped so that the water to be processed can be circulated smoothly, wherein the anode is not necessarily porous. When a porous anode is utilized, its porousness is preferably lower than that of the cathode, that is, the anodic current density is preferably higher than the cathodic current density. The following materials can be used for the anode: graphite, carbon, titanium covered with platinum oxide (an electrode of stable size), titanium covered with platinum, nickel, and ferrite.

In the multi-electrodes type of electrolytic bath of the present invention, the aforementioned cathode and anode may not be preferably separated by a diaphragm in order to form a cathodic and anodic chamber. However, a diaphragm may be used in the apparatus of the present invention, for example, the following are used for the diaphragm: a fiber cloth, a biscuit plate, sintered plastic, a perforated panel and an ion exchange membrane. When the distance between the two electrodes is shortened in order to reduce the voltage, an insulating spacer, for example, a net-shaped spacer which is made from a high molecular organic material, is preferably inserted between the electrodes in order to prevent a short-circuit.

When the water to be processed is supplied to the electrolytic bath in the state of a laminar flow, the water passes through the aforementioned electrolytic bath without sufficiently coming into contact with the surface of the single electrode type of cathode. Accordingly, the aforementioned porous cathode is installed inside the electrolytic bath without leaving any gaps, and further the water to be processed is preferably supplied to the electrolytic bath in the state of an eddy flow, the Reynold's number of which is not less than 500, so that the water can be sufficiently moved in the lateral direction.

When water is processed in the manner described above, the effective chloride component can be sufficiently removed by a single processing operation, so that the efficiency can be improved.

In the electrolytic bath of the present invention, a leakage current is generated, which flows from the electrolytic bath to other metallic parts such as a water pipe, and corrodes the metallic parts electrochemically. The aforementioned leakage current can be cut off in such a manner that: a member, the electrical conductivity of which is higher than that of the water to be processed, is installed on the back side of the electrode and in an inlet and outlet pipe of the electrolytic bath, wherein the end of the member is earthed.

When carbon materials such as activated carbon, graphite and carbon fiber are used for the aforementioned dielectric and oxygen gas is generated during the water processing, the aforementioned dielectric is oxidized by oxygen gas, and carbon is change into carbonic acid gas so that it is easily dissolved in water. In order to prevent dissolution of carbon in water, the following method may be adopted: a metallic material which is usually used for an insoluble metallic electrode, and which is made in such a manner that a platinum metallic oxide such as an iridium oxide and ruthenium oxide is coated on the base of titanium, is placed on the anodic side of the aforementioned dielectric, so that oxygen gas is largely generated on the metallic material.

In order to make the water to be processed circulate in the electrolytic bath effectively and to make all the water contact with the porous cathode, the porous cathode, the cross-sectional area of which is the same as that of the passage of flow, is provided in the aforementioned electrolytic bath in such a manner that no gap is left between the porous cathode and the inner wall of the electrolytic bath. In the manner described above, actually all the effective chloride components in the water to be processed are decomposed or reduced, so that the smell of bleach can be removed.

The structure of another multi-electrode fixed floor type of electrolytic bath which can be used for the apparatus of the present invention, is as follows: an anode and cathode are installed in a cylindrical electrolytic bath in order to feed electric power; a large number of conductive particles for fixed floor use which functions as a porous electrode, and insulating particles made from an insulating synthetic resin, the number of which is smaller than that of the aforementioned conductive particles for fixed floor use, are uniformly provided between the aforementioned electrodes. When a voltage is impressed upon the electrodes to feed electric power, the particles for fixed floor use are polarized in the same manner as the aforementioned dielectric, and one end of the particle is charged positive and the other end is charged negative. Accordingly, each particle is provided with the function of decomposing or reducing the effective chloride components contained in the water to be processed. The aforementioned insulating particles has the function of preventing the short-circuit of the electrodes for electric power feed use which is caused by the aforementioned conductive particles for fixed floor use.

The electrolytic bath composed in such a manner described above is installed in a water pipe line of purification plant or close to a faucet for domestic use, or in a pipe line for the apparatus for food processing. All or a portion of the water to be processed is introduced into the aforementioned electrolytic bath so that the effective chloride components can be decomposed or reduced. The electrolytic bath of the present invention is a type of multi-electrode, so that the water to be processed comes into contact with the cathode a plurality of times so that the effective chloride components can be positively removed by decomposition or reduction.

Referring now to FIG. 7–FIG. 9, a preferable embodiment of the multi-electrode type of electrolytic bath of the present invention will be explained as follows. However, it should be understood that the present invention is not limited to the specific embodiment.

FIG. 7 is a longitudinal sectional view showing a multi-electrode fixed floor type of electrolytic bath which can be used for the apparatus of the present invention. An anodic terminal 103 for electric power feed use and a cathodic terminal 104 for electric power feed use are installed in the upper and lower end portion inside a cylindrical electrolytic bath 102 having flanges 101 in its upper and lower end. The electrolytic bath 102 is preferably made from an insulating material which can endure even when it is used over a long period of time or it is repeatedly used. The aforementioned electrolytic bath 3 is preferably made from a durable material, for example, the following synthetic resins are preferably used: polyepichlorohydrin, polyvinyl methacrylate, polyethylene, polypropylene, polyvinyl chloride, polyethylene chloride, phenol formaldehyde resin, and the like. The aforementioned anodic terminal 103 upon which a DC voltage is impressed is made from the following materials: carbon materials (for example, activated carbon, charcoal, coke, and coal), graphite materials (for example, carbon fiber, carbon cloth, and graphite), carbon compound materials (for example, a sintered body composed of carbon and metal), non woven fabric of activated carbon fiber, the aforementioned materials coated with platinum, palladium, or nickel, titanium coated with platinum oxide, nickel, stainless steel, and iron. The cathodic terminal 4 upon which a negative DC voltage is impressed, is made from the following materials: platinum, stainless steel, titanium, nickel, copper, hastelloy, graphite, carbon, mild steel, or metallic material coated with platinum.

A plurality of sponge-shaped fixed floor 105, in the case of the example shown in FIG. 7, three sponge-shaped fixed floor 105 are laminated between the aforementioned electrode terminal =s 103, 104. Four mesh-shaped diaphragms or spacers 106 are pinched between the fixed floors, between the fixed floor 105 and the electrode terminal 103, and between the fixed floor 105 and the electrode terminal 104. The periphery of the fixed floor 105 is closely contacted with the inner wall of the electrolytic bath 102 so that the leakage of water between the fixed floor 105 and the inner wall can be reduced. When a diaphragm is used, the following materials are used for the diaphragm: fabric, a clay plate, sintered plastic, a porous plate, and an ion exchange membrane. The following materials are used for the spacer: insulating fabric, a porous plate, a net, and a rod.

While the water to be processed is supplied to the aforementioned electrolytic bath from the lower portion, an electric current is supplied to the electrodes. Then, the aforementioned fixed floors 105 are polarized as shown in the drawing in such a manner that the lower side is polarized to be positive and the upper side is polarized to be negative, so that a porous cathode is formed on the upper side of each fixed floor 105. The water to be processed comes into contact with the cathode, and the effective chloride components such as hypochlorous acid ions and chloride gas are decomposed or reduced so that they can be removed, and then the processed water is discharged from the upper portion of the electrolytic bath and used for drinking.

FIG. 8 shows another example of a multi-electrode fixed floor type of electrolytic bath which can be applied to the present invention. As compared with the electrolytic bath illustrated in FIG. 7, the electrolytic bath shown in FIG. 8 is structured in such a manner that: a mesh-shaped insoluble metallic material 107 is provided to the fixed floor 105 on the side which faces the cathode 104, that is, the side which is positively polarized and other portions are structured in the same manner as the electrolytic bath shown in FIG. 7, so that like reference characters designate like or corresponding parts throughout the views and explanations are omitted.

Polarization strongly occurs and gas is generated on both edges of the fixed floor 105 upon which a DC voltage has been impressed. Accordingly, the edge of the fixed floor 105 which faces the cathode 104 is firstly dissolved since gas is the most intensely generated in those edge portions. When a insoluble metallic material 107 is installed in these portions as illustrated in the drawing, over-voltage of the insoluble metallic material 107 is lower than that of the carbon material which composes the fixed floor 105, so that almost all oxygen gas is generated from the aforementioned insoluble metallic material and the generated gas does not come into contact with the fixed floor 105. As a result, dissolution of the aforementioned fixed floor 105 can be effectively prevented. The water to be processed which has been supplied to the electrolytic bath 102 is processed so that the effective chloride components can be removed, in the same manner as the electrolytic bath shown in FIG. 7.

FIG. 9 shows another example of the multi-electrode fixed floor type of electrolytic bath of the present invention.

A mesh-shaped anode 113 and cathode 114 are provided in the upper and lower edge inside a cylindrical electrolytic bath 112 in the upper and lower portion of which flanges 111 are provided. The electrolytic bath 112 is preferably made from an electrically insulating material, especially synthetic resin, in order to improve its durability.

In the space between the electrodes 113, 114, a large number of porous particles 115 forming a fixed floor which are made from a conductive material such as a carbon material, and insulating particles 118, the number of which is smaller than the aforementioned particles forming a fixed floor, which is made from a synthetic resin, for example, are uniformly mixed. The aforementioned insulating particles has the function to prevent a short-circuit of the aforementioned anode and cathode.

When the water to be processed is supplied to the aforementioned electrolytic bath from the lower portion while an electric current is fed to the electrodes, the anodic side of the aforementioned porous particles 115 is polarized to be negative, and the cathodic side is polarized to be positive, and as a result, the porous particles function as a porous electrode, the surface area of which is very wide. The effective chloride components in the water to be processed can be removed in the same manner as the electrolytic baths shown in FIG. 7 and FIG. 8.

FIG. 10 to FIG. 14 show the 10th to 14th embodiment of the present invention, wherein three dimensional porous carbon electrodes are provided to the electrolytic baths of the aforementioned embodiments.

When an electrolytic process is conducted in an electrolytic bath or when water is processed in the electrolytic bath, the electrolytic solution or the water is required to contact with the electrode as long as possible, so that the electrolytic solution or the water to be processed must stay inside the electrode as long as possible. In other words, it is necessary for the water to penetrate and permeate into the aforementioned electrode. In order to make the water to be processed penetrate into the electrode and cause an electrochemical reaction, it is desirable to use a material, the resistance of which is low and over-voltage of electrolytic reaction is high so that an electrolytic reaction can be caused in a wide area. The reason why is that: when a material of low resistance is used, an electric current can be uniformly dispersed all over the electrode; and when over-voltage is high, a required reaction is caused not only on the surface of the electrode but also inside the electrode. In the case where over-voltage is low, the reaction is caused only on the surface of the electrode, so that the usage of a porous cathode becomes meaningless.

Resistance of the aforementioned carbon materials is low and over-voltage is high, so that they can be effectively used for the apparatus of the present invention. Further, carbon materials are not toxic at all, and ions and hydroxides are not formed, so that they are suitable for drinking water or food processing water which is ingested into human body. The area of the contact surface is extremely wide, so that the processing efficiency of effective chloride components can be largely improved. Furthermore, carbon materials are advantageous in that: they are inexpensive, and even when an electrolytic operation has been stopped, carbon materials are not corroded. Consequently, it is advantageous from the viewpoints of economy and operability.

The electrolytic baths of the 10th to 14th embodiments can be applied to various electrochemical reaction in which oxygen gas is not generated too much on the anode. The aforementioned electrolytic bath is advantageous when the water to be processed is disinfected and the smell of bleach is removed from drinking water. Photographic processing agents and drinking water having the smell of bleach can be processed in the aforementioned electrolytic bath as follows: the water to be processed is supplied to the three-dimensional electrode type of electrolytic bath in which the aforementioned carbon electrode is used; and a DC or AC current is impressed upon the electrolytic bath in order to disinfect microorganisms in the aforementioned processing agent and to decompose the smell of bleach in drinking water. The following are included in the aforementioned microorganisms: a bacteria, mold, yeast, muxomycetes, unicellular algae, protozoa, virus and the like. The smell of bleach is mainly caused by chloride or the effective chloride component such as hypochlorite.

A photographic processing agent includes an adequate amount of salt and gelatin which nourish microorganism, and further the agent is maintained to an adequate temperature, so that mold and bacterium tend to breed in the aforementioned photographic processing agent. Cleaning water which is used in the process of paper making is also provided with an adequate amount of nourishment, and further its temperature is suitable for microorganisms to breed. Furthermore, the temperature of water which is used for bath is maintained to the temperature of 35°–45° C., so that microorganisms are propagated very quickly.

When the water to be processed is supplied to the aforementioned carbon electrode type of electrolytic bath, microorganisms are contacted with the surfaces of the anode and cathode of the aforementioned electrolytic bath due to the dispersion and movement of the liquid, and the aforementioned microorganisms are subjected to a strong redox-reaction on the surfaces of the anode and cathode. Accordingly, the microorganisms are exterminated when they contact with a current of high voltage.

When drinking water in which the effective chloride components are contained is processed, the chloride components are contacted with the carbon electrode and the chloride components are electrochemically reduced. As a result, the smell of bleach can be removed from drinking water.

When a hypochlorous acid ion, which is the principal component of the effective chloride component contained in the water to be processed, is contacted with the aforementioned carbon electrode, it is decomposed to a chloride ion and water according to the following equation.

$$ClO^- + 2H^+ + 2e^- \rightarrow Cl^- + H_2O$$

Further, residual chloride in the water to be processed is contacted with the cathode and reduced according to the following equation.

$$Cl_2 + 2e^- \rightarrow 2\ Cl^-$$

To process drinking water and water to be used for food processing, is a primary object of the present invention. In this case, drinking water includes city water, and food processing water includes water in which perishable foods are cleaned, and further includes water which is contained in perishable foods.

The carbon electrode type of electrolytic bath of the present invention is a three-dimensional electrode fixed floor type of electrolytic bath, that is, a single electrode fixed floor type of electrolytic bath and multi-electrode fixed floor type of electrolytic bath, so that the three-dimensional porous carbon electrode has a wide surface area. Accordingly, the contact surface area of the electrode and the water to be processed can be increased and the apparatus can be made compact, and further the efficiency of electrochemical treatment can be improved.

The electrodes installed in the multi-electrode fixed floor type of electrolytic bath of the present invention are generally composed of a three-dimensional porous carbon electrode, auxiliary electrode and electrode to supply electric power, and the shape of the carbon electrode is determined in accordance with the shape of the electrolytic bath. The aforementioned carbon electrode can be composed of the following materials: carbon materials such as activated carbon, graphite and carbon fiber, the shape of which is like felt, fabric and porous block; and carbon materials coated with a precious metal. A multi-electrode fixed floor type of electrolytic bath provided with a three-dimensional electrode can be formed in such a manner that: one or a plurality of dielectrics made from the aforementioned materials are placed in a DC or AC electric field; a plate-shaped, expand-mesh-shaped, or perforated-blade-shaped porous electrodes for supplying electric power are provided on both sides so that a DC or AC voltage is impressed; and the aforementioned dielectric is polarized. The multi-electrode fixed floor type of electrolytic bath may be also composed as follows: pieces of a three-dimensional material which function as an anode or cathode are alternately installed in such a manner that they are not short-circuited; and they are electrically connected with each other. When a carbon material is used as a dielectric, the higher its dielectric coefficient is, the higher its polarity degree is, and the anode and cathode are effectively formed, so that water processing can be conducted effectively. Consequently, a carbon material, the volume resistivity of which is higher than $1 \times 10^{-6} \Omega \cdot cm$, is preferably used for the fixed floor.

In the case where activated carbon, graphite or carbon fiber is used for the aforementioned dielectric and water is processed while oxygen gas is generated from the anode, the aforementioned dielectric is oxidized by oxygen gas and carbon dioxide is generated. The auxiliary electrode utilized in the electrolytic bath of the present invention is provided to prevent the dissolution of dielectric. In this case, the dissolution of a carbon electrode, which is a dielectric, can be prevented as follows: an auxiliary electrode is contacted with or placed close to the carbon electrode on the positive polarization side so that oxygen gas is mainly generated on the auxiliary electrode, wherein the auxiliary electrode is made from a porous material such as titanium coated with platinum, oxidized iridium, oxidized ruthenium, the over-voltage of which is lower than that of carbon materials conventionally used for an insoluble metallic electrode.

In order to prevent the dissolution of the carbon electrode, the aforementioned auxiliary electrode is provided in such a manner that the auxiliary electrode is contacted with or placed close to the surface of the carbon electrode on the side which functions as an electrode through a diaphragm or not through a diaphragm.

When the opening rate of the auxiliary electrode is excessively high, the dissolution of carbon can not be prevented sufficiently, so that the opening rate is determined not more than 80% in order to prevent the deterioration of the carbon electrode. When the opening rate is too low, a big pressure loss is caused, so that the water to be processed can not be circulated smoothly. Therefore, the opening rate of the auxiliary electrode is preferably not less than 10%.

It is preferable that the aforementioned auxiliary electrode is closely contacted with the carbon electrode, and preferably contacted with pressure For example, the auxiliary electrode is contacted with the carbon electrode with the contact pressure of 0.1 kg/cm². In the manner described above, the carbon electrode and auxiliary electrode are electrically connected with each other. Accordingly, in the process of electrolysis, oxygen gas is generated on the surface of the auxiliary electrode, the over-voltage of which is low, and oxygen gas is scarcely generated on the surface of the carbon electrode, so that the dissolution of the carbon electrode can be inhibited and its durability is improved.

In any cases, when there is a gap in the electrolytic bath through which the water to be processed passes without contacting with the electrode and dielectric, the processing efficiency is lowered, so that it is preferable that the short-cut of water is prevented.

When the inside of the electrolytic bath is divided into an anodic and cathodic chamber, a diaphragm may be used or may not be used. In either case, an electric current can be fed to the electrolytic bath. When the diaphragm is not utilized and the distance between the electrodes, or between the dielectric and the electrode, or between the dielectrics, is required to be shortened, an insulating spacer, for example, a net-shaped spacer made from an organic high molecular material may be inserted between both electrodes or between the aforementioned dielectrics in order to prevent a short-circuit. When a diaphragm is used, a diaphragm is preferably used which is made from porous material, for example, the opening rate of which is not less than 10% and not more than 95%, and preferably not less than 20% and not more than 80%. The diaphragm must be provided with fine holes through which the water to be processed can be passed.

When the electrolytic baths of the 10th-14th embodiment are used for the purpose of disinfection or removal of the smell of bleach, it is sufficient that the water to be processed containing microorganisms or effective chloride components is contacted with a carbon electrode upon which a voltage is impressed. It is not essential to make an electric current flow between the electrodes in order to actually cause an electrolytic reaction accompanied by the generation of hydrogen and oxygen gas. A low voltage, by which an electrolytic reaction is not actually caused, is rather impressed upon the surface of the electrode. The reason for that is as follows: First, the carbon electrode is consumed when oxygen gas is generated. Second, when an electrolytic reaction is actually caused, the water to be processed is chemically affected by the gas generation, so that a complicated reaction is caused in a photographic processing agent and a required characteristic can not be maintained. Third, electric power is consumed for a chemical reaction except for disinfection of microorganisms, which is not economical. Further, the gas generated in the aforementioned chemical reaction covers the surface of the electrode, so that microorganisms are not effectively contacted with the surface of the electrode and disinfection efficiency is lowered.

In the case where an electrochemical treatment is conducted in the electrolytic bath of the present invention, a voltage is preferably impressed upon the electrode in such a manner that: in order to confirm that oxygen gas is not actually generated in the anode and processing is effectively conducted, the voltage of $+0.2$ to $+1.2$ V (vs. SCE) is impressed upon the anode so that a very small amount of gas can be generated; and the voltage of the cathode can be 0 to $-1.0$ V (vs.SCE) so that hydrogen gas is not actually generated. Even when a very small amount of gas is generated, the carbon electrode is consumed so that the aforementioned auxiliary electrode is provided in order to inhibit the consumption of the electrode.

When water is processed in the aforementioned electrolytic bath, the water can be sufficiently processed by a one-pass processing, so that efficiency can be improved.

In the electrolytic bath of the present invention, a leakage current occurs, and the leakage current flows from the electrolytic bath to other members, for example, a photographic processing tank, through the photographic processing agent, so that an undesirable chemical reaction is caused in the tank, and further the wall of the photographic tank is electrochemically corroded and the material composing the wall is dissolved into the processing agent. In order to prevent the damage caused by the leakage current, the leakage current can be cut off in such a manner that: a member, the conductivity of which is higher than the water to be processed, is provided on the back side of the electrode or in the pipe close to the inlet or outlet of the electrolytic tank, wherein one end of the member is grounded.

In the above explanation, the electrolytic bath of the present invention is used for disinfection and removal of the effective chloride components. However, it should be understood that the usage of the electrolytic bath of the present invention is not limited, and it can be applied to a usual electrolytic reaction.

Referring now to the attached drawings, a preferable embodiment of the electrolytic bath of the present invention will be explained as follows. However, it should be understood that the present invention is not limited to the specific embodiments.

Figure 10:
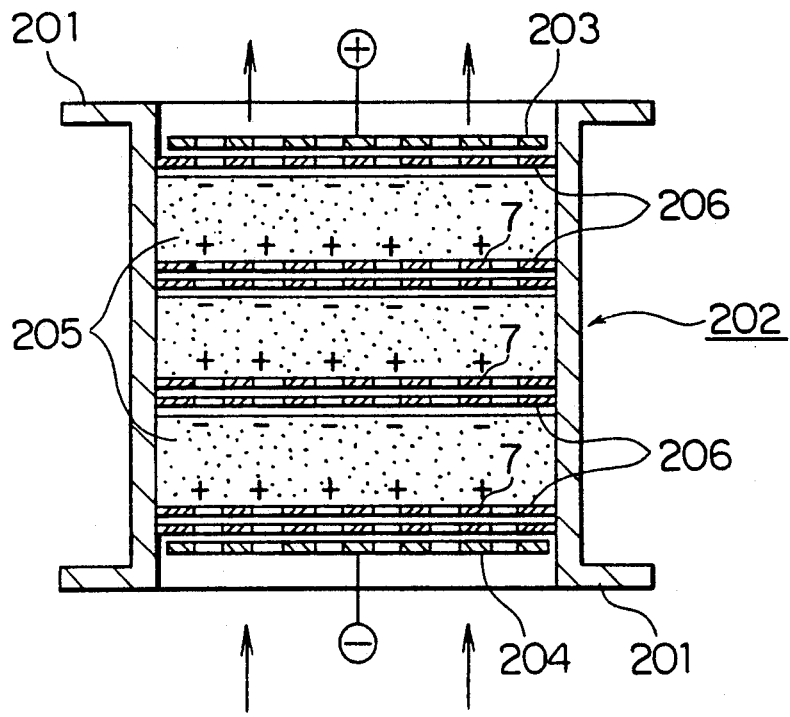
FIG. 10–FIG. 14 show five examples of an electrolytic bath having an auxiliary electrode relating to the present invention.

FIG. 10 is a sectional view showing an embodiment of the multi-electrode fixed floor type of electrolytic bath in which a carbon electrode is used, of the present invention.

A mesh shaped anode terminal to be used for electric power supply 203 and cathode terminal 204 to be used for electric power supply are provided in the upper and lower edge inside a cylindrical electrolytic bath 202 in the upper and lower portion of which flanges 201 are provided. In order to improve the durability, the electrolytic bath 202 is preferably made from an electrically insulating material, especially a synthetic resin which will be described as follows. The aforementioned electrolytic bath is preferably made from a durable material, for example, the following synthetic resins are preferably used: polyepichlorohydrin, polyvinyl methacrylate, polyethylene, polypropylene, polyvinyl chloride, polyethylene chloride, phenol formaldehyde resin, and the like. The aforementioned anode terminal 203 is made from a carbon material (for example, activated carbon, charcoal, coke, and coal), graphite, (for example, carbon fiber, carbon cloth, and graphite), carbon compound (for example, a sintered body composed of carbon and metallic particles), nonwoven fabric made of activated carbon fabric (for example, KE-1000 felt produced by Toyo Boseki co Ltd.,), the above-described materials coated with platinum, palladium or nickel, a stabilized dimension electrode (titanium coated with platinum oxide), titanium coated with platinum, nickel, stainless steel, or iron. The cathode terminal 204 is made from platinum, stainless steel, titanium, nickel, copper, hastelloy, graphite, carbon, mild steel, or a metallic material coated with platinum.

A plurality of fixed floors 205, in the embodiment shown in FIG. 10, three fixed floors made from carbon material such as activated carbon, graphite and carbon fiber, are laminated between the electrode terminals 203, 204. Four porous diaphragms or spacers 206 are provided between the fixed floors 205, and between the fixed floors 205 and the aforementioned electrode terminals 203, 204. The auxiliary electrode 207 composed of an insoluble metallic material coated with platinum oxide is provided on the surface of the aforementioned fixed floor 205 on the side of the aforementioned cathode terminal 204, wherein oxygen gas is most intensely generated in this portion.

When the aforementioned electrolytic bath is electrified while the water to be processed, for example, washing water used in a photographic process, is supplied as shown by an arrow in the drawing, the lower surface of the fixed floor 205 is polarized to be positive and the upper surface is polarized to be negative, so that an electric potential is generated inside the fixed floor 205 and between the fixed floors 205. Water passing through the electrolytic bath comes into contact with the fixed floor 205 having the aforementioned potential, and mold and microorganisms in the water can be exterminated. The water to be processed is discharged from the upper portion of the electrolytic bath and circulates in the apparatus so that it can be used for cleaning. Since the over-voltage of the aforementioned auxiliary electrode 207 is lower than that of the carbon material composing the fixed floor 205, almost all oxygen gas is generated from the auxiliary electrode, so that the fixed floor 205 is not contacted with oxygen gas and dissolution of the fixed floor 205 can be effectively inhibited.

The electrolytic bath shown in FIG. 10 can be used not only for a photographic processing agent but also water in a public pool and water for other usages.

Figure 11:
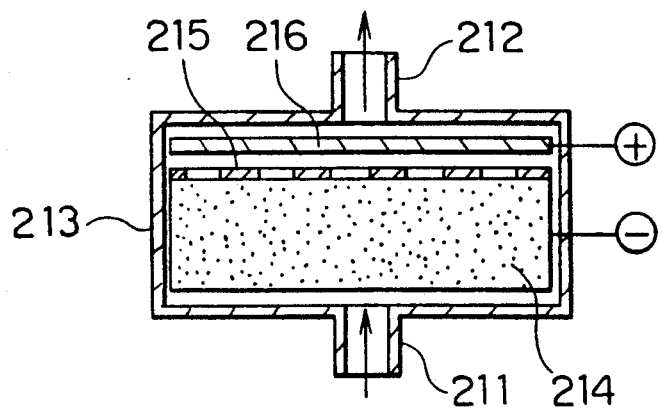

FIG. 11 is a sectional view showing an embodiment of the single electrode fixed floor type of electrolytic bath of the present invention, in which a carbon electrode is used.

A cylindrical electrolytic bath 213 is provided with a roof plate and bottom plate. An inlet port 211 is formed in the center of the bottom plate, and an outlet 212 is formed in the center of the roof plate. A low height cylindrical porous fixed floor type of carbon cathode 214 is installed in a lower position inside the electrolytic bath 213 in such a manner that a narrow gap can be formed between the cathode 14 and the inner wall of the electrolytic bath 213. An auxiliary electrode 215 is provided on the upper surface of the cathode 214 in such a manner that the auxiliary electrode 215 closely comes into contact with the cathode 214. Further, an anode 216 composed of a mesh-shaped titanium covered with platinum oxide is placed above the auxiliary electrode 215 leaving a narrow gap.

When the aforementioned electrolytic bath 213 is connected to a pipe close to a faucet, water is processed as follows: drinking water containing hypochlorous acid ions is supplied from the inlet 211; and the drinking water comes into contact with the lower surface of the porous cathode 214 and penetrates into the cathode 214 so that hypochlorite acid ions and chloride ions are decomposed or reduced and the smell of bleach is removed. Since water flows upward in the electrolytic bath, a small amount of hydrogen and oxygen gas generated in the electrolytic reaction can be easily discharged outside the electrolytic bath together with the water which has been processed.

Hypochlorous acid ions are sufficiently contacted with the surface of the cathode 214 and the aforementioned decomposing and reducing reaction is conducted according to electrochemical laws. As explained before, oxygen gas generated on the surface of anode 216 scarcely comes into contact with the cathode 214. However, in this electrolytic bath, the anode and cathode are sometimes inverted. In this case, the cathode 213 illustrated in the drawing functions as an anode, and oxygen gas is generated on its surface. In this case, the over-voltage of the aforementioned auxiliary electrode 215 is high, so that almost all oxygen gas is generated on the surface of the auxiliary electrode 215 and dissolution of a carbon electrode can be prevented.

Figure 12:
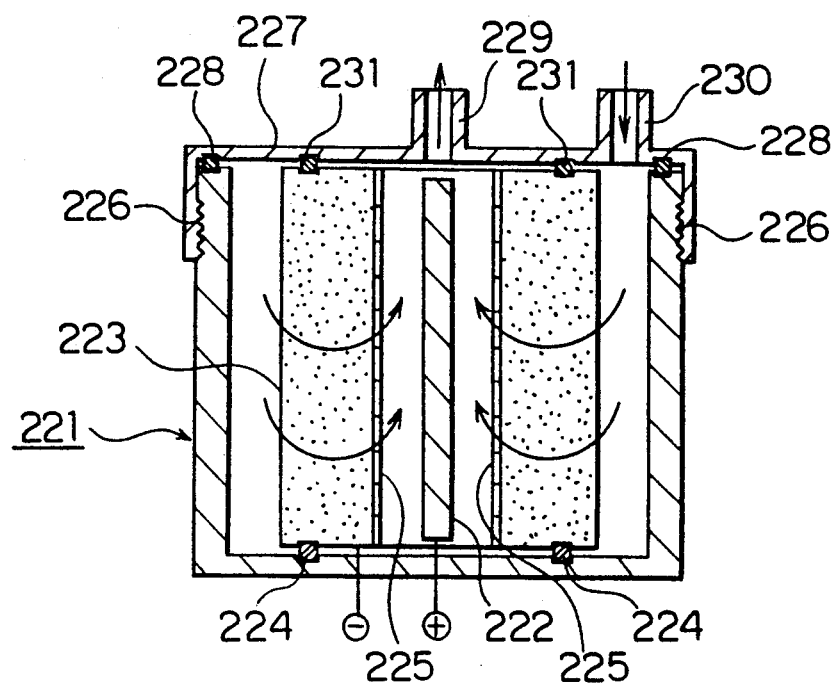

FIG. 12 is a sectional view showing another embodiment of the single electrode fixed floor type of electrolytic bath of the present invention, in which a carbon electrode is used.

A rod-shaped anode 222 is provided in the center inside a cylindrical electrolytic bath 221. A doughnut-shaped cathode 223 composed of a carbon material is provided around the aforementioned anode 222 leaving a gap between the inner wall of the cathode 223 and the outer face of the anode 222 in such a manner that the cathode 223 is contacted with the inner lower surface of the aforementioned electrolytic bath 221 through an O-ring 224. An auxiliary electrode 225 composed of a porous insoluble metallic material is provided on the inner circumferential surface of the cathode 223 which faces the aforementioned anode 222. A screw section 226 is formed on the upper outer circumferential surface of the aforementioned electrolytic bath 221, and a screw formed on the peripheral inner surface of a disk-shaped lid 227, the peripheral portion of which is bent downward, engages with the aforementioned screw 226, and the gap between the the lid 227 and the electrolytic bath 221 is sealed by an O-shaped ring 228 which is provided on the upper edge of the electrolytic bath 221. An outlet 229 is provided in the center of the upper surface of the aforementioned lid 227, and an inlet 230 is provided in the position located a little outside the outlet 229. An O-shaped ring 231 is provided between the lower surface of the lid 227 and the upper surface of the cathode 223.

When drinking water is supplied to the aforementioned electrolytic bath 221 from the inlet 230, the drinking water penetrates the porous cathode 223 from the periphery so that the effective chloride component can be decomposed or reduced and microorganisms can be exterminated, and then reaches the inside of the doughnut-shaped cathode 223 and rises inside the space of the cathode, and finally discharges from the aforementioned outlet 229.

In the same manner as the electrolytic bath shown in FIG. 11, oxygen gas is generated on the surface of the auxiliary electrode 225 in this electrolytic bath and is not generated on the surface of the electrode 223 made from a carbon material, so that the dissolution of the carbon electrode 223 can be inhibited and the life can be prolonged.

Figure 13:
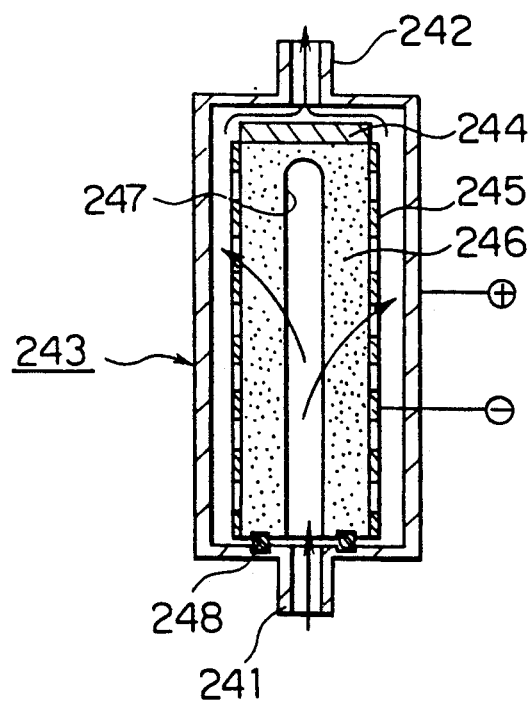

FIG. 13 is a sectional view showing another embodiment of the single electrode fixed floor type of electrolytic bath of the present invention, in which a carbon electrode is used.

The cylindrical inner wall of an electrolytic bath 243 functions as an anode, and an inlet 241 is provided to the center portion of the bottom plate of the electrolytic bath 243, and further an outlet 242 is provided to the center portion of the roof of the electrolytic bath 243. Inside the electrolytic bath 243, a cylindrical porous cathode 246 made from a carbon material is provided in such a manner that a baffle plate 244 is mounted on the upper surface of the cathode 246; and a small gap is formed between the baffle plate 244 and the inner wall of the electrolytic bath 243, wherein a porous auxiliary electrode 245 made from an insoluble metallic material is provided around the cathode 246 coming into close contact with the cathode, and wherein a cut-out portion 247 is formed in the cathode 246 from the lower center to the upper side of the cathode and the cut-out portion 247 reaches a position below the aforementioned baffle plate 244. An O-shaped ring 248 is provided between the lower surface of the cathode 246 and the lower inside surface of the electrolytic bath 243 in order to prevent the leakage of water.

When drinking water is supplied to the electrolytic bath 243 from the inlet 241, the leakage of water from the gap between the lower inner surface of the electrolytic bath 243 and the lower surface of the cathode 246 is prevented by the aforementioned O-shaped ring, so that the water rises inside the aforementioned cut-out portion 247, and then penetrates the aforementioned porous cathode 246. Then the water reaches the outer periphery of the cathode 246, and further rises and passes in the gap formed above the baffle plate 244, and finally discharges from the outlet 242 to the outside of the apparatus.

In the same manner as the electrolytic baths shown in FIG. 11 and FIG. 12, oxygen gas is generated on the surface of the auxiliary electrode 245 in this electrolytic bath and is not generated on the surface of the electrode 246 made from a carbon material, so that the dissolution of the carbon electrode 246 can be inhibited and the life can be prolonged.

Figure 14:
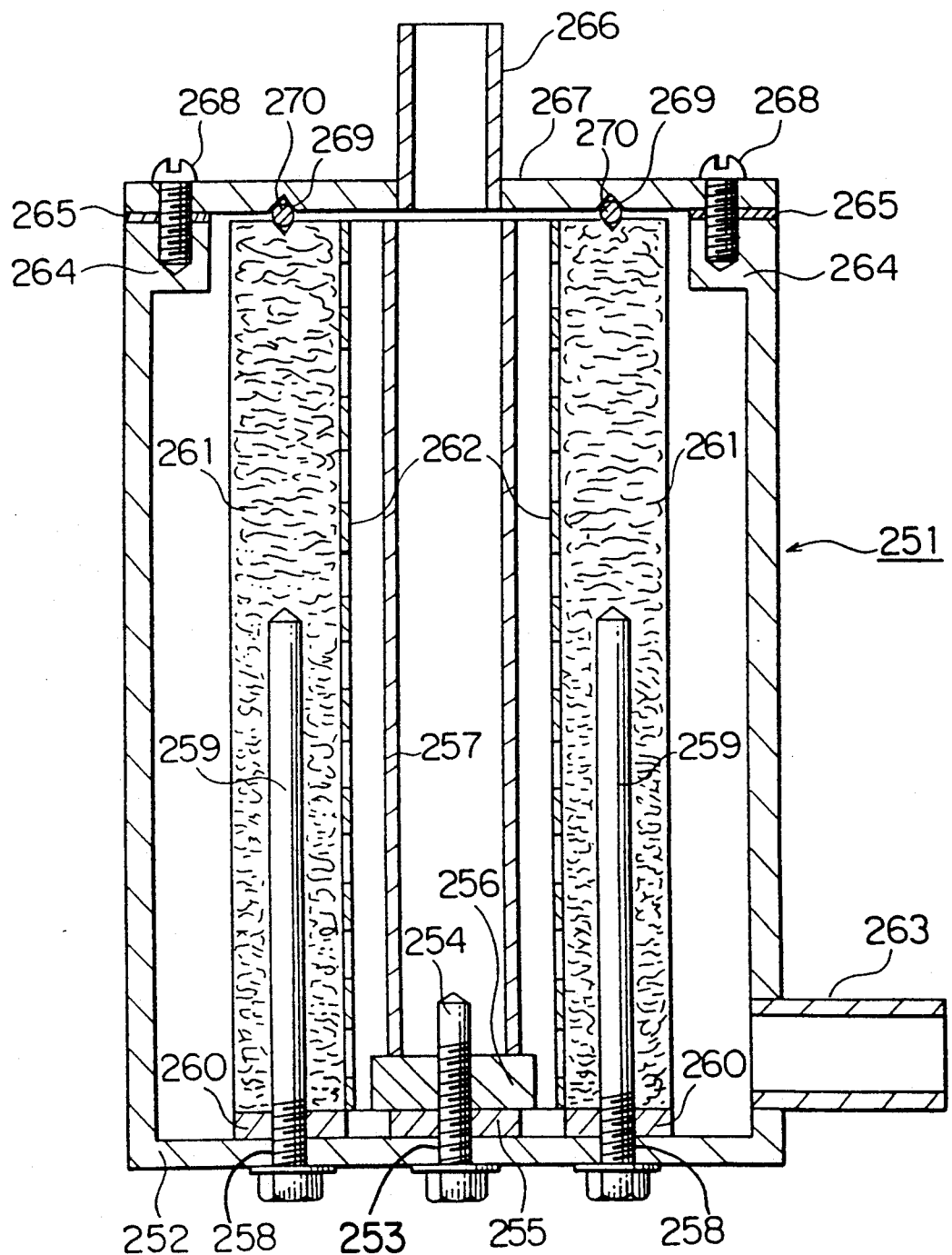

FIG. 14 is a sectional view showing another embodiment of the single electrode fixed floor type of electrolytic bath of the present invention, in which a carbon electrode is used.

A through hole 253 is formed in the center of a bottom plate 252 of a cylindrical electrolytic both 251. A bolt 254 to feed electric power is screwed into the through hole 253. The bolt 254 is also screwed in to an anodic base 256 through an insulating member 255 provided on the aforementioned bottom plate 252. A mesh-shaped cylindrical anode 257 is fixed to the upper periphery of the anodic base 256 by means of welding and the like. Two through holes 258 are formed in the aforementioned bottom plate 252 in such a manner that the distances between the through hole 253 and the two through holes 258 are the same. Long bolts 259 to feed electric power are respectively screwed into the through holes 258. A short doughnut-shaped insulating member 260 is disposed upon the aforementioned bottom plate 252 in such a manner that: the center of the doughnut-shaped insulating member 260 coincides with the aforementioned through hole 253 and the short doughnut-shaped insulating member 260 overlaps with the aforementioned through holes 258. A long doughnut-shaped cathode 261 made from a carbon material is disposed on the insulating member 260, wherein the lateral shapes of the insulating member 260 and the cathode 261 are the same. The cathode 261 is fastened to the bottom plate 252 by the aforementioned long bolt 259 together with the aforementioned insulating member 260. A porous auxiliary electrode 262 made from an insoluble metallic material is provided around the aforementioned cathode 261 in such a manner that the auxiliary electrode 262 closely comes into contact with the cathode 261. Numeral 263 is an outlet for the water to be processed which is laterally formed in the lower side portion of the electrolytic bath 251.

An protruded portion 264 which protrudes inside is formed on the upper periphery of the electrolytic bath 251. A packing 256 is disposed on the upper surface of the protruded portion 264. A disk-shaped lid 267, the center portion of which is provided with an inlet 266 for the water to be processed, is fastened to the aforementioned protruded portion 264 by a screw 268. A v-shaped circular groove 269 is respectively formed on the lower surface of the aforementioned lid 267 and the upper surface of the cathode 261 in such a manner that the V-shaped circular groove formed on the lower surface of the lid 267 is opposed to that formed on the upper surface of the cathode 261. A O-shaped ring 270 is disposed between the V-shaped grooves.

When the water to be processed such as drinking water is supplied to the electrolytic bath 251 from the inlet 266 while an electric current is fed to the electrodes 251, 257, the water to be processed flows in such a manner that: the water to be processed passes through the aforementioned mesh-shaped anode 257; the water reaches the inner circumferential surface of the aforementioned cathode 261; when the water permeates through the cathode 261, the water is sufficiently processed; then, the water reaches the outer circumferential surface of the cathode 261; and the water is discharged from the outlet 263 to the outside of the electrolytic bath.

In this electrolytic bath, the dissolution of the electrode 261 made from a carbon material can be effectively inhibited.

Then, the results of an experiment conducted by the single electrode type of electrolytic bath of the present invention will be described as follows. However, it should be understood that the present invention is not limited by the results of the experiment.

INVENTIVE EXAMPLE 1-1

An electrolytic bath of Embodiment 1 of the present invention shown in FIG. 1 was used for processing, which was made from a transparent hard polyvinylchlorite resin, and the height was 60 mm and the inner diameter was 40 mm. A cathode made of carbon fibers was installed inside the aforementioned electrolytic bath, wherein the opening rate of the cathode was 80%, the diameter was 39 mm, and the thickness was 10 mm. A mesh-shaped titanium member plated with platinum was also installed as shown in the drawing, wherein the opening rate of the member was 38%, the diameter was 39 mm, and the thickness was 1 mm. The water to be tested was prepared in such a manner that: a water solution of sodium hypochlorite was added to city water so that the concentration of the effective chloride components could be 1–20 ppm.

Water supply was set to 2.5 l/min, a voltage of 3.5 V was impressed upon the electrodes, and an electric current of 60 mA was fed. Under the conditions mentioned above, the concentration of hypochlorous acid ions in the water to be processed was varied as shown in Table 1. After the water had passed through the electrolytic bath, the concentration of hypochlorous acidions was measured by means of colorimetric analysis using ortho-toluidine. The results are shown in Table 1-1.

COMPARATIVE EXAMPLE 1-1

Forty grams of activated carbon, the particle size of which was 2-5 μm, was filled into a column of 40 mm in diameter. In this case, 1500 l of water in which 2 ppm of effective carbon was contained, had previously passed through the aforementioned activated carbon. Into this column, the water to be tested which contained sodium hypochlorite, the concentration of which was the same as that shown in Table 1 of Inventive Example 1-1, was supplied at a rate of 2.5 l/min. Then, the concentration of hypochlorous acid in the water which was flowing out from the column was measured by the same method as that used in Inventive Example 1-1. The results are shown in Table 1.

TABLE 1-1

| Concentration of ClO Ions Before Electrolytic Bath ppm | Inventive Example 1-1 Concentration of ClO Ions After Electrolytic Bath ppm | Comparative Example 1-1 Concentration of ClO Ions After Electrolytic Bath ppm | Comparative Example 1-2 Concentration of ClO Ions After Electrolytic Bath ppm |
|---|---|---|---|
| 0.5 | 0 | 0.5 | 0.1 |
| 1 | 0 | 0.9 | 0.3 |
| 2 | 0 | 1.2 | 0.5 |
| 3 | 0 | 1.1 | 0.5 |
| 4 | 0 | 1.6 | 0.9 |
| 5 | 0 | 1.8 | 1.3 |
| 7 | 0 | 2.1 | 1.4 |
| 10 | 0.1 | 3.2 | 2.3 |
| 15 | 0.1 | 5.1 | 2.1 |
| 20 | 0.1 | 7.8 | 3.3 |

COMPARATIVE EXAMPLE 1-2

A mesh shaped cathode, the diameter of which was 39 mm and the thickness was 1 mm, was used. Other experimental conditions were the same as those of Inventive Example 1-1. The concentration of hypochlorous ions in the water was measured by the same method as Inventive Example 1-1. The results are shown in Table 1-1.

According to the results shown in table 1-1, it can be realized that: when a porous cathode was used, the concentration of hypochlorous acid ions was remarkably reduced as compared with a case in which a mesh-shaped cathode was used or the water was processed with activated carbon.

INVENTIVE EXAMPLE 1-2

In this example, the material composing the fixed floor electrode was changed, and other conditions were the same as those of the electrolytic bath of Inventive Example 1-1.

City water to which sodium hypochlorite was added so that the concentration could be 2 ppm, was used for the water to be tested. The water was supplied to the electrolytic bath made from the materials shown in Table 2 at a rate of 2.5 l/min so that water processing was conducted. After that, the concentration of sodium hypochlorite ions was measure at the outlet by the same method as that used in Inventive Example 1-1. The results were shown in Table 1-2

TABLE 1-2

| Material Composing Electrode | Concentration of ClO Ions after Electrolytic Bath ppm |
|---|---|
| Graphite | 0 to 0.1 |
| Activated Carbon | |
| Carbon Fiber | |
| Sintered Nickel | 0.3 to 0.7 |
| Expanded Mesh Made from Ti | |
| Expanded Mesh Made from SUS304 | |
| Fiber-shaped SUS316 | |

According to the experimental results shown in Table 1-2, it can be realized that: When an electrode was made from a carbon material, hypochlorous acid ions were almost completely decomposed; and when other materials were used, the efficiency of decomposition of hypochlorous acid ions was lowered.

INVENTIVE EXAMPLE 1-3

In this experiment, a porous graphite cathode was applied to the electrolytic bath of Inventive Example 1-1. When the opening rate of graphite was varied, the concentration of hypochlorous acid ions was measured at the outlet (wherein the initial concentration was 2 ppm), and a difference of pressure between the water at the inlet and outlet, in other words, a pressure loss was measured. The results are shown in Table 1-3.

According to the results shown in table 1-3, the decomposition of hypochlorous acid ions were satisfactorily accomplished when the opening rate was in the range of 10–95%.

TABLE 1-3

| Opening rate % | Concentration of ClO Ions ppm | Pressure Loss mmHg |
| --- | --- | --- |
| 5.2 | 0 | 1756 |
| 10.4 | 0 | 871 |
| 18.3 | 0 | 418 |
| 27.4 | 0 | 271 |
| 42.1 | 0 | 125 |
| 53.5 | 0 | 81 |
| 71.8 | 0 | 68 |
| 83.8 | 0 | 41 |
| 94.9 | 0.1 | 23 |
| 96.2 | 0.3 | 7 |
| 97.3 | 0.3 | 5 |

As shown in the experimental results, when a single electrode type of electrolytic bath of the present invention is utilized, hypochlorous ions or residual chloride contained in drinking water are sufficiently contacted with the surface of the porous cathode and almost completely removed, so that drinking water in which the effective chloride components are not contained, can be obtained.

Drinking water has been conventionally processed with activated carbon. On the other hand, electrochemical laws are utilized in the water processing of the present invention, so that the effective chloride components such as hypochlorous acid ions are positively decomposed or reduced and converted into tasteless and scentless chloride ions, and further the members inside the electrolytic bath are scarcely consumed and water processing can be continued over a long period of time.

Since the single electrode type of electrolytic bath of the present invention is provided with only one anode and cathode. Consequently, the voltage to be impressed upon the electrodes is lower than that of a multi-electrode type of electrolytic bath, so that a commercially available dry battery is sufficient to provide the voltage to the electrodes. Accordingly, the apparatus can be made compact.

In many cases, drinking water obtained from a water system smells of bleach. However, when the drinking water is processed by the method of the present invention, the smell of bleach can be removed, so that it is possible to provide a tasty drinking water.

There is caused an electrolytic reaction in the method of water processing of the present invention. However, the amount of effective chloride components contained in drinking water is usually very small, for example, several ppm, so that gas is not actually generated on the surface of a cathode during the electrolytic reaction. In the case where gas is generated in the reaction, some problems are caused in the composition of the drinking water to be processed, so that it is preferable that the potential of a cathode is maintained to be a voltage of −0.1 to −1.0 V(vs. SHE) at which gas generation is not actually caused. When the potential of a cathode is maintained in the aforementioned range, electric power consumption is approximately zero, so that the cost in electricity can be remarkably reduced.

In order to improve the operation efficiency, a so-called one-pass processing in which the water processed in an electrolytic bath is not circulated, is preferably conducted. In order to achieve this one-pass-processing, the manner to install a porous cathode and the opening rate are adjusted so that the water to be processed can stay in the electrolytic bath longer or the condition of a turbulent flow can be caused in the electrolytic bath.

In the apparatus of the present invention, actually all the water is processed while permeating into the porous cathode provided in the single electrode type of electrolytic bath so that the effective chloride components can be decomposed or reduced and converted into chloride gas.

The porous cathode used for the apparatus of the present invention is preferably made from a carbon material. The surface area of the porous cathode made from a carbon material is so wide that there is a high probability that the effective chloride component come into contact with the surface of the porous cathode, and further the over-voltage of a carbon material is high so that the water to be processed can permeate into the cathode, and the water can be processed on all the surface of the cathode. Consequently, the processing efficiency can be improved as compared with other materials. Furthermore, the carbon material is not toxic at all, and ions and hydroxides are not formed at all, so that it is suitable for processing drinking water. The price of carbon material is reasonable, and even when electrolysis has been stopped, corrosion does not occur in the case of carbon material. Accordingly, carbon material is advantageous from the economical and operational viewpoint.

It is preferable that the opening rate of the porous cathode is not less than 10% and not more than 95%. When the opening rate is maintained in the aforementioned range, the effective chloride components in water can be satisfactorily decomposed and reduced.

In the electrolytic bath according to the present invention, a leakage current is generated and flows into other metallic members such as a water pipe. In this case, the metallic members are electrochemically corroded. In order to prevent the aforementioned corrosion of the metallic members, a member, the conductivity of which is higher than that of the water to be processed, can be provided in an adequate position where the anode and cathode are not faced with each other, in such a manner that: one end of the member is grounded so that the aforementioned leakage current can flow into the ground.

When the water to be processed flows in the electrolytic bath in the form of a laminar flow, the water to be processed is not sufficiently contacted with the porous cathode. Therefore, it is preferable that the water to be processed flows in the form of a turbulent flow, the Reynold's number of which is no less than 500, and moves laterally so that the water can be sufficiently contacted with the cathode.

The results of an experiment conducted with the multi-electrode type of electrolytic bath of the present invention are described as follows. It should be understood that the present invention is not limited by the specific experimental results.

INVENTIVE EXAMPLE 2-1

An electrolytic bath shown in FIG. 1 was used for processing, which was made from a transparent hard polyvinylchlorite resin, and the height was 100 mm and the inner diameter was 50 mm. Three fixed floors made of carbon fibers were installed inside the aforementioned electrolytic bath. The opening rate of the fixed floor was 60%, the diameter was 50 mm, and the thickness was 10 mm. The fixed floors were installed in such a manner that: the fixed floors were pinched by 4 diaphragms made from polyethylene, the opening ratio of which was 85%, the diameter was 50 mm, and the thickness was 1.5 mm; and a mesh-shaped anodic terminal and cathodic terminal made from titanium plated with platinum, the diameter of which was 48 mm, and the thickness was 1.0 mm, were closely contacted with the upper and lower fixed floor. The water to be tested was prepared in such a manner that: a water solution of sodium hypochlorite was added to city water so that the concentration of the effective chloride components could be 1-20 ppm.

Water supply was set to 2.5 l/min, a voltage of 16.0 V was impressed upon the electrodes, and an electric current of 60 mA was fed. Under the conditions mentioned above, the concentration of hypochlorous acid ions in the water to be processed was varied as shown in Table 1. After the water had passed through the electrolytic bath, the concentration of hypochlorous acid ions was measured by means of colorimetric analysis using orthotoluidine. The results are shown in Table 2-1.

TABLE 2-1

| Concentration of ClO Ions Before Electrolytic Bath ppm | Inventive Example 2-1 Concentration of ClO Ions After Electrolytic Bath ppm | Comparative Example 2-1 Concentration of ClO Ions After Electrolytic Bath ppm |
| --- | --- | --- |
| 0.5 | 0 | 0.5 |
| 1 | 0 | 0.9 |
| 2 | 0 | 1.2 |
| 3 | 0 | 1.1 |
| 4 | 0 | 1.6 |
| 5 | 0 | 1.8 |
| 7 | 0 | 2.1 |
| 10 | 0 | 3.2 |
| 15 | 0.1 | 5.1 |
| 20 | 0.1 | 7.8 |

COMPARATIVE EXAMPLE 2-1

Forty grams of activated carbon, the particle size of which was 2-5 μm, was filled into a column of 40 mm in diameter and 100 mm in height. In this case, 1500 l of water in which 2 ppm of effective carbon was contained, had previously passed through the aforementioned activated carbon. Into this column, the water to be tested which contained sodium hypochlorite, the concentration of which was the same as that shown in Table 2-1 of Inventive Example 2-1, was supplied at a rate of 2.5 l/min. Then, the concentration of hypochlorous acid in the water which was flowing out from the column was measured by the same method as that used in Inventive Example 2-1. The results are shown in Table 23-1.

According to the results shown in table 2-1, it can be realized that: when a porous cathode was used, the concentration of hypochlorous acid ions was remarkably reduced as compared with a case in which a mesh-shaped cathode was used or the water was processed with activated carbon.

INVENTIVE EXAMPLE 2-2

In this example, the material composing the fixed floor electrode was changed, and other conditions were the same as those of the electrolytic bath of Inventive Example 2-1.

City water to which sodium hypochlorite was added so that the concentration could be 2 ppm, was used for the water to be tested. The water was supplied to the electrolytic bath made from the materials shown in Table 2 at a rate of 2.5 l/min so that water processing was conducted. After that, the concentration of sodium hypochlorite ions was measure at the outlet by the same method as that used in Inventive Example 2-1. The results were shown in Table 2-2.

TABLE 2-2

| Material Composing Electrode | Concentration of ClO Ions after Electrolytic Bath ppm |
| --- | --- |
| Graphite | 0 to 0.1 |
| Activated Carbon | |
| Carbon Fiber | |
| Sintered Nickel | 0.8 to 1.7 |
| Expanded Mesh Made from Ti | |
| Expanded Mesh Made from SUS304 | |
| Fiber-shaped SUS316 | |

According to the experimental results shown in Table 2-2, it can be realized that: When an electrode was made from a carbon material, hypochlorous acid ions were almost completely decomposed; and when other materials were used, the efficiency of decomposition of hypochlorous acid ions was lowered.

INVENTIVE EXAMPLE 2-3

In this experiment, a porous graphite cathode was applied to the electrolytic bath of Inventive Example 2-1. When the opening rate of graphite was varied, the concentration of hypochlorous acid ions was measured at the outlet (wherein the initial concentration was 2 ppm), and a difference of pressure between the water at the inlet and outlet, in other words, a pressure loss was measured. The results are shown in Table 2-3.

According to the results shown in table 2-3, the decomposition of hypochlorous acid ions were satisfactorily accomplished when the opening rate was in the range of 10-95%.

TABLE 2-3

| Opening rate % | Concentration of ClO Ions ppm | Pressure Loss mmHg |
| --- | --- | --- |
| 5.2 | 0 | 1756 |
| 10.4 | 0 | 871 |
| 18.3 | 0 | 418 |
| 27.4 | 0 | 271 |
| 42.1 | 0 | 125 |
| 53.5 | 0 | 81 |
| 71.8 | 0 | 68 |
| 83.8 | 0 | 41 |
| 94.9 | 0 | 23 |
| 96.2 | 0.3 | 7 |
| 97.3 | 0.3 | 5 |

As shown in the experimental results, when a single electrode type of electrolytic bath of the present invention is utilized, hypochlorous ions or residual chloride contained in drinking water are sufficiently contacted with the surface of the porous cathode and almost completely removed, so that drinking water in which the effective chloride components are not contained, can be obtained.

Drinking water has been conventionally processed with activated carbon. On the other hand, electrochemical laws are utilized in the water processing of the present invention, so that the effective chloride components such as hypochlorous acid ions are positively decomposed or reduced and converted into tasteless and scentless chloride ions, and further the members inside the electrolytic bath are scarcely consumed and water processing can be continued over a long period of time.

In the water processing method of the present invention, the water to be processed comes into contact with a plurality of cathodes and the effective chloride components are decomposed or reduced, so that they can be removed almost perfectly.

In many cases, drinking water obtained from a water system smells of bleach. However, when the drinking water is processed by the method of the present invention, the smell of bleach can be removed, so that it is possible to provide a tasty drinking water.

There is caused an electrolytic reaction in the method of water processing of the present invention. However, the amount of effective chloride components contained in drinking water is usually very small, for example, several ppm, so that gas is not actually generated on the surface of a cathode during the electrolytic reaction. In the case where gas is generated in the reaction, some problems are caused in the composition of the drinking water to be processed, so that it is preferable that the potential of a cathode is maintained to be a voltage of −0.1 to −1.0 V(vs. SHE) at which gas generation is not actually caused. When the potential of a cathode is maintained in the aforementioned range, electric power consumption is approximately zero, so that the cost in electricity can be remarkably reduced.

In order to improve the operation efficiency, a so-called one-pass-processing in which the water processed in an electrolytic bath is not circulated, is preferably conducted. In order to achieve this one-pass-processing, the manner to install a porous cathode and the opening rate are adjusted so that the water to be processed can stay in the electrolytic bath longer or the condition of a turbulent flow can be caused in the electrolytic bath.

In the apparatus of the present invention, actually all the water is processed while permeating into the porous cathode provided in the multi-electrode type of electrolytic bath so that the effective chloride components can be decomposed or reduced and converted into chloride gas.

The porous cathode used for the apparatus of the present invention is preferably made from a carbon material. The surface area of the porous cathode made from a carbon material is so wide that there is a high probability that the effective chloride component come into contact with the surface of the porous cathode, and further the over-voltage of a carbon material is high so that the water to be processed can permeate into the cathode, and the water can be processed on all the surface of the cathode. Consequently, the processing efficiency can be improved as compared with other materials. Furthermore, the carbon material is not toxic at all, and ions and hydoxides are not formed at all, so that it is suitable for processing drinking water. The price of carbon material is reasonable, and even when electrolysis has been stopped, corrosion does not occur in the case of carbon material. Accordingly, carbon material is advantageous from the economical and operational viewpoint.

It is preferable that the opening rate of the porous cathode is not less than 10% and not more than 95%. When the opening rate is maintained in the aforementioned range, the effective chloride components in water can be satisfactorily decomposed and reduced.

In the electrolytic bath according to the present invention, a leakage current is generated and flows into other metallic members such as a water pipe. In this case, the metallic members are electrochemically corroded. In order to prevent the aforementioned corrosion of the metallic members, a member, the conductivity of which is higher than that of the water to be processed, can be provided in an adequate position where the anode and cathode are not faced with each other, in such a manner that: one end of the member is grounded so that the aforementioned leakage current can flow into the ground.

When the water to be processed flows in the electrolytic bath in the form of a laminar flow, the water to be processed is not sufficiently contacted with the porous cathode. Therefore, it is preferable that the water to be processed flows in the form of a turbulent flow, the Reynold's number of which is no less than 500, and moves laterally so that the water can be sufficiently contacted with the cathode.

In the electrolytic bath according to the present invention, chloride ions which have been generated on the surface of the cathode by the decomposition of hypochlorous acid ions, are not oxidized on the surface of the cathode. Consequently, it is not necessary to use a diaphragm in order to separate the electrolytic bath into an anodic chamber and a cathodic chamber. As a result, the structure of the electrolytic bath can be simplified.

The results of an experiment conducted with the electrolytic bath of the present invention are described as follows. It should be understood that the present invention is not limited by the specific experimental results.

INVENTIVE EXAMPLE 3-1

An electrolytic bath shown in FIG. 10 was used for processing, which was made from a transparent hard polyvinylchlorite resin, and the height was 50 mm and the inner diameter was 50 mm. Three fixed floors made of carbon fibers were installed inside the aforementioned electrolytic bath. The opening rate of the fixed floor was 60%, the diameter was 49 mm, and the thickness was 10 mm. An auxiliary electrode made of a titanium plate coated with platinum; the diameter of which was 49 mm, and the thickness was 1 mm, was closely contacted with the lower surface of each fixed floor. These fixed floors were pinched by 4 spacers made from polyethylene, the opening ratio of which was 85%, the diameter was 50 mm, and the thickness was 1.0 mm. Before an electric current was supplied to the electrolytic bath, the average dry weight of the fixed floors was 78.5 g. The aforementioned water to be processed was prepared in such a manner that: a water solution of sodium hypochlorite was added to faucet water so that the concentration of the effective chloride components could be 5 ppm.

Water processing was conducted under the conditions that the water to be processed was supplied by 2.5 l/min, the initial voltage was set to 20.0 V, and the current was set to 60 mA, and the secular change of voltage was measured. The results are shown in Table 3-1.

TABLE 3-1

| Electrification Period (hour) | Inventive Example 3-1 Voltage (V) | Comparative Example 3-1 Voltage (V) |
| --- | --- | --- |
| 0.1 | 20.0 | 20.0 |
| 5 | 19.9 | 20.0 |
| 10 | 20.0 | 19.9 |
| 15 | 20.0 | 20.0 |
| 20 | 20.0 | 19.9 |
| 30 | 19.9 | 19.9 |
| 50 | 20.0 | 19.8 |
| 100 | 20.0 | 19.5 |
| 200 | 20.0 | 19.3 |
| 300 | 19.9 | 19.3 |
| 400 | 20.0 | 18.8 |
| 500 | 19.9 | 18.7 |

When 600 hours had passed after the start of electrification, the test was stopped and the electrolytic bath was overhauled to inspect the 4 fixed floors, and their dry weight was measured. The measure average weight was 78.4 g, which was almost the same as the weight before the electric current was fed to the electrolytic bath. According to the results of a visual inspection conducted on each fixed floor, there was no change.

COMPARATIVE EXAMPLE 3-1

In this case, an auxiliary electrode was not used, and other points were the same as Inventive Example 3-1. By the same operation as Inventive Example 3-1, the water to be tested was processed. The secular change of voltage is shown in FIG. 3-1.

The dry weight of fixed floor was measured in the same manner as Inventive Example 3-1, and the average weight was 62.7 g. There were uneven portions caused by dissolution on the anodic polarized side of each fixed floor.

When a comparison is made between Inventive Example 3-1 and Comparative Example 3-1, the following has been found: when an auxiliary electrode is used, the dissolution of the fixed floor made from a carbon material can be inhibited, and an electrolytic operation can be stably conducted with a low voltage over a long period of time.

INVENTIVE EXAMPLE 3-2

Variations in resistance were studied which were caused by the difference of contact pressure between the auxiliary electrode and fixed floor (which is a three-dimensional porous electrode).

Figure 15:
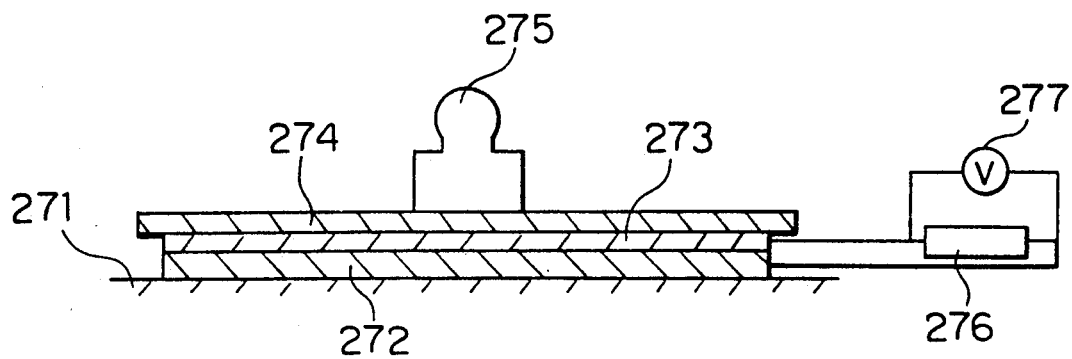
FIG. 15 is a schematic illustration of a measuring apparatus used in an embodiment of the present invention.

The testing apparatus is shown in FIG. 15.

An auxiliary electrode 73 (which was made of an expanded titanium mesh with holes, the major axis of which was 8 mm, the minor axis was 4 mm, and the thickness was 1 mm), the size of which was 4 cm×4 cm×1 mm, was put upon a porous graphite plate 272 (made by Toyo Carbon Co. Ltd.,), the size of which was 5 cm×5 cm×2 cm, which was placed on a base stand 271. A weight 274 was put upon the auxiliary electrode 73 through a plate 274 made from a vinyl-chlorite resin. The contact pressure between the aforementioned graphite plate 272 and the auxiliary electrode 273 was varied by changing the weight 274.

As illustrated in FIG. 15, the aforementioned graphite plate 272 and the auxiliary electrode 273 are connected to the positive and negative terminals of a rectifier 276, and the voltage was measured by a voltmeter 277 at each weight when a rated current of 0.5 A flowed. The results are shown on the graph in FIG. 16.

Figure 16:
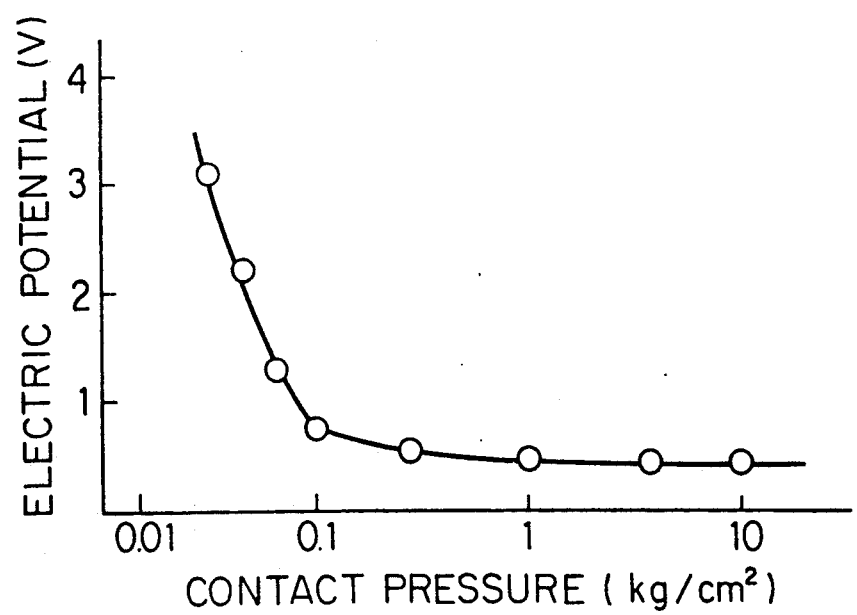
FIG. 16 is a graph showing the relation between the contact pressure and voltage used in the measuring apparatus illustrated in FIG. 15.

According to the graph illustrated in FIG. 16, when the contact pressure between the graphite plate 272 and the auxiliary electrode 273 is smaller than 0.1 kg/cm$^2$, the voltage is reduced as the contact pressure increases. However, when the contact pressure is not less than 0.1 kg/cm$^2$, the voltage is not affected by the contact pressure.

INVENTIVE EXAMPLE 3-3

In this example, the electrolytic bath used in Inventive Example 3-1 was used, and the opening rate of the auxiliary electrode was varied as shown in Table 3-2, and faucet water was used for the water to be tested. Other conditions were the same as described before. After a water processing operation was conducted for 200 hours, the consumption of carbon fiber of the fixed floor, the electrolytic voltage to obtain a current of 50 mA, and the pressure loss caused when the water passed through the electrolytic bath were measured. The results are shown in Table. 3-2.

According to Table 3-2, when the opening rate of the auxiliary electrode is smaller than 10%, the pressure loss is increased, and when the opening rate exceeds 80%, the consumption of carbon fibers starts.

TABLE 3-2

| Opening Ratio of Auxiliary Electrode (%) | Electrolytic Voltage (V) | Consumption of Carbon Fiber | Pressure Loss (mmHg) |
| --- | --- | --- | --- |
| 5 | 19.1 | Non | 3400 |
| 7.3 | 19.4 | Non | 2100 |
| 10.2 | 19.7 | Non | 1500 |
| 21.1 | 20.1 | Non | 300 |
| 50.7 | 20.6 | Non | 260 |
| 72.5 | 20.7 | Non | 260 |
| 80.8 | 20.9 | Trace | 250 |
| 85.3 | 23.1 | Small Amount | 230 |
| 90.2 | 24.7 | Small Amount | 210 |

The carbon electrode type of electrolytic bath of the present invention is a three-dimensional electrode type of electrolytic bath characterized in that: at least a portion of the three-dimensional porous carbon electrode is contacted with an auxiliary electrode made from a material, the over-voltage in oxygen gas generation of which is smaller that of the carbon electrode, and the opening rate of the auxiliary electrode is not more than 80%.

When the water to be processed such as drinking water is processed by the electrolytic bath of the present invention, microorganisms and the effective chloride components contained in the water are sufficiently contacted with the surface of the carbon electrode, so that the microorganisms are exterminated and the chloride components are decomposed or reduced. Accordingly, the microorganisms and effective chloride components are almost completely removed and clean water can be obtained.

Drinking water has been conventionally processed with activated carbon. On the other hand, electrochemical laws are utilized in the water processing of the present invention, so that the effective chloride components such as hypochlorous acid ions are positively decomposed or reduced and converted into tasteless and scentless chloride ions, and further the members inside the electrolytic bath are scarcely consumed and water processing can be continued over a long period of time.

In the apparatus of the present invention, a carbon electrode is used. The surface area of the carbon electrode is very wide, and there is a high probability that the effective chloride components come into contact with the surface of the carbon electrode, and further its resistance is low and an electrolytic reaction occurs in a wide area of the electrode, so that the over-voltage of the electrolytic reaction is high. Consequently, the water to be processed penetrates into the electrode and the water processing can be conducted all over the electrode surface, and the processing efficiency can be remarkably improved. Furthermore, the carbon material is not toxic at all, and ions and hydoxides are not formed at all, so that it is suitable for processing drinking water. The price of carbon material is reasonable, and even when electrolysis has been stopped, corrosion does not occur in the case of carbon material. Accordingly, carbon material is advantageous from the economical and operational viewpoint.

An auxiliary electrode made from an insoluble metallic material, the over-voltage of which is lower than that of a carbon material, is installed in the electrolytic bath of the present invention in such a manner that the auxiliary electrode is closely contacted with the carbon material or a narrow gap is made between the auxiliary electrode and the carbon electrode. Therefore, even when oxygen gas is generated in an electrolytic reaction, gas generation selectively occurs on the aforementioned auxiliary electrode. Accordingly, the dissolution of carbon can be prevented. While the electrolytic characteristic of the carbon electrode is utilized to the utmost, the consumption of the carbon electrode can be inhibited during water processing. In order to prevent the dissolution of the carbon electrode, the opening rate of the auxiliary electrode is set to not more than 80%. In order to circulate the water to be processed smoothly, the opening rate is preferably not less than 10%.

When the aforementioned auxiliary electrode is closely contacted with a contact pressure of not less than 0.1 kg/cm², the aforementioned water processing can be effectively conducted on the carbon electrode.

As explained before, the auxiliary electrode is made from an insoluble material, the over-voltage of which is lower than that of the carbon electrode. For example, an insoluble metal such as titanium plated with platinum or its oxide is used for the auxiliary electrode.

What is claimed is:

1. An apparatus for the treatment of water comprising a container having an inlet and an outlet, said container adapted to permit said water to flow along a flow path from said inlet to said outlet,
    an electrode array in said flow path and comprising an anode and a cathode, said array adapted to generate an electric field between said anode and said cathode, said anode and said cathode being perforated to permit passage of said water therethrough;
    a first electrode having a rigid carbonaceous porous body between said anode and said cathode and adapted to distribute an electric charge therein, said electric charge generated by said electric field, said porous body having a first portion and a second portion, said first portion being directed toward said cathode so that a positive electric charge is induced therein, said second portion being directed toward said anode so that a negative electric charge is induced therein; and
    a second perforated electrode on a surface of said first portion, wherein said second perforated electrode is stronger in tendency toward oxygen gas generation than said first portion.

2. The apparatus of claim 1 wherein said second perforated electrode is made of a water insoluble metallic material.

3. The apparatus of claim 1 wherein a first area ratio of pore openings to surface area of said porous body is 10% to 95%.

4. The apparatus of claim 3 wherein said first area ratio is 20% to 80%.

5. The apparatus of claim 1 wherein a second area ratio of pore openings to surface area of said perforated electrode is 10% to 80%.

6. The apparatus of claim 1 wherein said perforated electrode contacts said rigid porous body with a contact pressure greater than 0.1 kg/cm².

7. The apparatus of claim 2 wherein said metallic material is titanium metal coated with a metal of the platinum group of the Periodic Table.

8. The apparatus of claim 1 wherein said container is cylindrical.

9. The apparatus of claim 2 wherein there is a plurality of said porous bodies between said anode and said cathode, said second electrode comprises a plurality of perforated electrodes, each located on one said first portion, auxiliary electrodes each located on one said surface.

10. The apparatus of claim 1 wherein said first electrode has a first overvoltage adapted to generate oxygen gas and said second electrode has a second overvoltage adapted to generate oxygen gas, said first overvoltage being greater than said second overvoltage, so that oxygen gas generation is limited to said second electrode.

11. The apparatus of claim 9 further comprising a plurality of spacers, each being located between said porous bodies.

* * * * *